United States Patent
Orji et al.

(10) Patent No.: US 9,964,656 B2
(45) Date of Patent: May 8, 2018

(54) METHODS AND SYSTEMS TO REMOVE PARTICLE-MOTION-SENSOR NOISE FROM VERTICAL-VELOCITY DATA

(71) Applicant: PGS Geophysical AS, Oslo (NO)

(72) Inventors: Okwudili Chuks Orji, Oslo (NO); Endrias Getachew Asgedom, Oslo (NO); Walter Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 339 days.

(21) Appl. No.: 14/715,188

(22) Filed: May 18, 2015

(65) Prior Publication Data

US 2016/0061979 A1 Mar. 3, 2016

Related U.S. Application Data

(60) Provisional application No. 62/043,632, filed on Aug. 29, 2014.

(51) Int. Cl.
*G01V 1/28* (2006.01)
*G01V 1/36* (2006.01)
*G06F 11/30* (2006.01)

(52) U.S. Cl.
CPC ........ *G01V 1/364* (2013.01); *G01V 2210/144* (2013.01); *G01V 2210/324* (2013.01)

(58) Field of Classification Search
CPC .................................................. G01V 1/364
See application file for complete search history.

(56) References Cited

U.S. PATENT DOCUMENTS

| 5,754,492 A | 5/1998 | Starr |
| 5,774,416 A | 6/1998 | Sadek et al. |
| 5,825,716 A | 10/1998 | Starr |
| 6,654,693 B2 | 11/2003 | Sen et al. |
| 6,894,948 B2 * | 5/2005 | Brittan .................. G01V 1/364 367/24 |
| 7,239,577 B2 | 7/2007 | Tenghamn et al. |

(Continued)

FOREIGN PATENT DOCUMENTS

| EP | 2 685 288 A2 | 1/2014 |
| WO | 2008109692 A2 | 9/2008 |
| WO | 2009136156 A1 | 11/2009 |

OTHER PUBLICATIONS

Search Report, Application No. GB1515372.9, dated Jan. 14, 2016.
(Continued)

*Primary Examiner* — Phuong Huynh

(57) ABSTRACT

Methods and systems that remove particle-sensor noise from measured vertical-velocity wavefield are presented. A approximate vertical-velocity data is computed from pressure data and vertical-velocity data at receiver coordinates of a seismic data acquisition system. The pressure data is composed of a pressure signal component and pressure-sensor noise and the vertical-velocity data is composed of a vertical-velocity signal component and particle-motion-sensor noise. A filter that gives a minimum difference between the vertical-velocity data and the approximate vertical-velocity data at each receiver coordinate is computed. Vertical-velocity data composed of the vertical-velocity signal component and approximate particle-motion-sensor noise based on the pressure-sensor noise is convolved with the filter at each receiver coordinate.

30 Claims, 18 Drawing Sheets

(56) References Cited

U.S. PATENT DOCUMENTS

| | | |
|---|---|---|
| 7,286,690 B2 | 10/2007 | Kelly |
| 7,359,283 B2 | 4/2008 | Vaage et al. |
| 7,675,812 B2 | 3/2010 | Ferris |
| 7,684,281 B2 | 3/2010 | Vaage et al. |
| 7,835,225 B2 | 11/2010 | Sollner et al. |
| 7,872,942 B2 | 1/2011 | Sollner |
| 7,929,373 B2 | 4/2011 | Barr, Jr. |
| 8,089,825 B2 | 1/2012 | Barr, Jr. et al. |
| 8,427,901 B2 | 4/2013 | Lunde et al. |
| 8,553,490 B2 | 10/2013 | Hillesund et al. |
| 8,811,115 B2 | 8/2014 | Cambois |
| 2010/0027375 A1 | 2/2010 | Barr, Jr. |
| 2014/0016436 A1 | 1/2014 | Sollner et al. |
| 2015/0063064 A1* | 3/2015 | van Groenestjin .... G01V 1/362 367/21 |
| 2016/0061979 A1* | 3/2016 | Orji ........................ G01V 1/364 702/16 |

OTHER PUBLICATIONS

Asgedom, Endrias G., et al., "Pressure Normal Derivative Extraction for Arbitrarly Shaped Surfaces", 2014 SEG, SEG Denver 2014 Annual Meeting, pp. 4243-4247.

\* cited by examiner

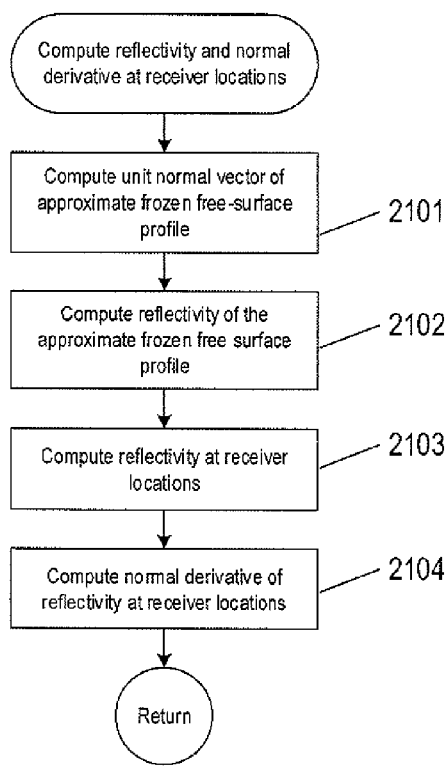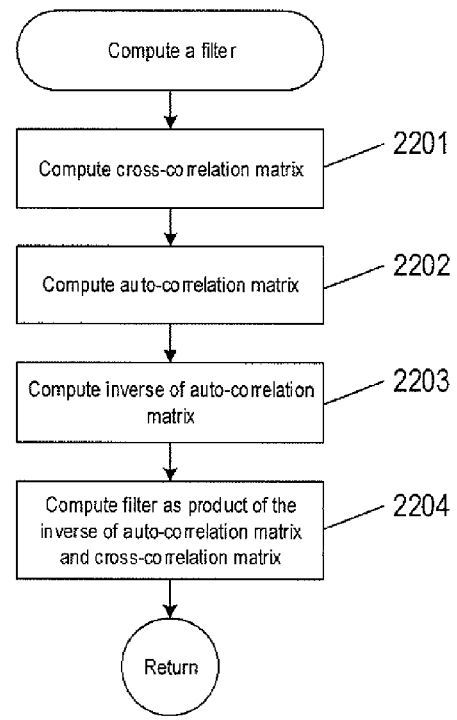
FIG. 21                              FIG. 22

METHODS AND SYSTEMS TO REMOVE PARTICLE-MOTION-SENSOR NOISE FROM VERTICAL-VELOCITY DATA

CROSS-REFERENCE TO A RELATED APPLICATION

This application claims the benefit of Provisional Application 62/043,632, filed Aug. 29, 2014.

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic signals produced by one or more submerged seismic sources. The acoustic signals travel down through the water and into the subterranean formation. At interfaces between different types of rock or sediment of the subterranean formation a portion of the acoustic signal energy may be refracted, a portion may be transmitted, and a portion may be reflected back toward the formation surface and into the body of water. A typical marine survey is carried out with a survey vessel that passes over the illuminated subterranean formation while towing elongated cable-like structures called streamers. The streamers may be equipped with a number of seismic sensors, such as collocated, dual pressure and particle-motion sensors that detect pressure and vertical particle motion wavefields, respectively, associated with the acoustic signals reflected back into the water from the subterranean formation. The pressure sensors generate seismic data that represents the pressure wavefield and the particle-motion sensors generate seismic data that represents the particle motion wavefield. The survey vessel receives and records the seismic data generated by the sensors. However, particle-motion sensors may have a lower signal-to-noise ratio than pressure sensors, because particle-motion sensors are typically more sensitive to various kinds of noise. For example, particle-motion sensors are often sensitive to low-frequency noise created by streamer vibrations. Those working in the field of marine exploration seismology seek methods and systems that reduce noise in seismic data generated by particle-motion sensors.

DESCRIPTION OF THE DRAWINGS

FIG. 21 shows a flow diagram of the routine "compute reflectivity and normal derivative of approximate frozen free-surface profile" called in FIG. 19.

FIG. 22 shows a flow diagram of the routine "compute filter f" called in FIG. 18.

DETAILED DESCRIPTION

Methods and systems that remove particle-sensor noise from vertical-velocity data generated by particle-motions sensors are described. In one aspect, approximate vertical-velocity data is computed from pressure data and vertical-velocity data at receiver coordinates of a seismic data acquisition system. The pressure data is composed of a pressure signal component and pressure-sensor noise and the vertical-velocity data is composed of a vertical-velocity signal component and particle-motion-sensor noise. A filter gives a minimum difference between the vertical-velocity data and the approximate vertical-velocity data at each of the receiver coordinates is computed. Noise-corrected vertical-velocity data composed of the vertical-velocity signal component and approximate vertical-velocity noise convolved with the filter is computed at each of the receiver coordinates. The approximate vertical-velocity noise is composed of the pressure-sensor noise.

Figure 1A:
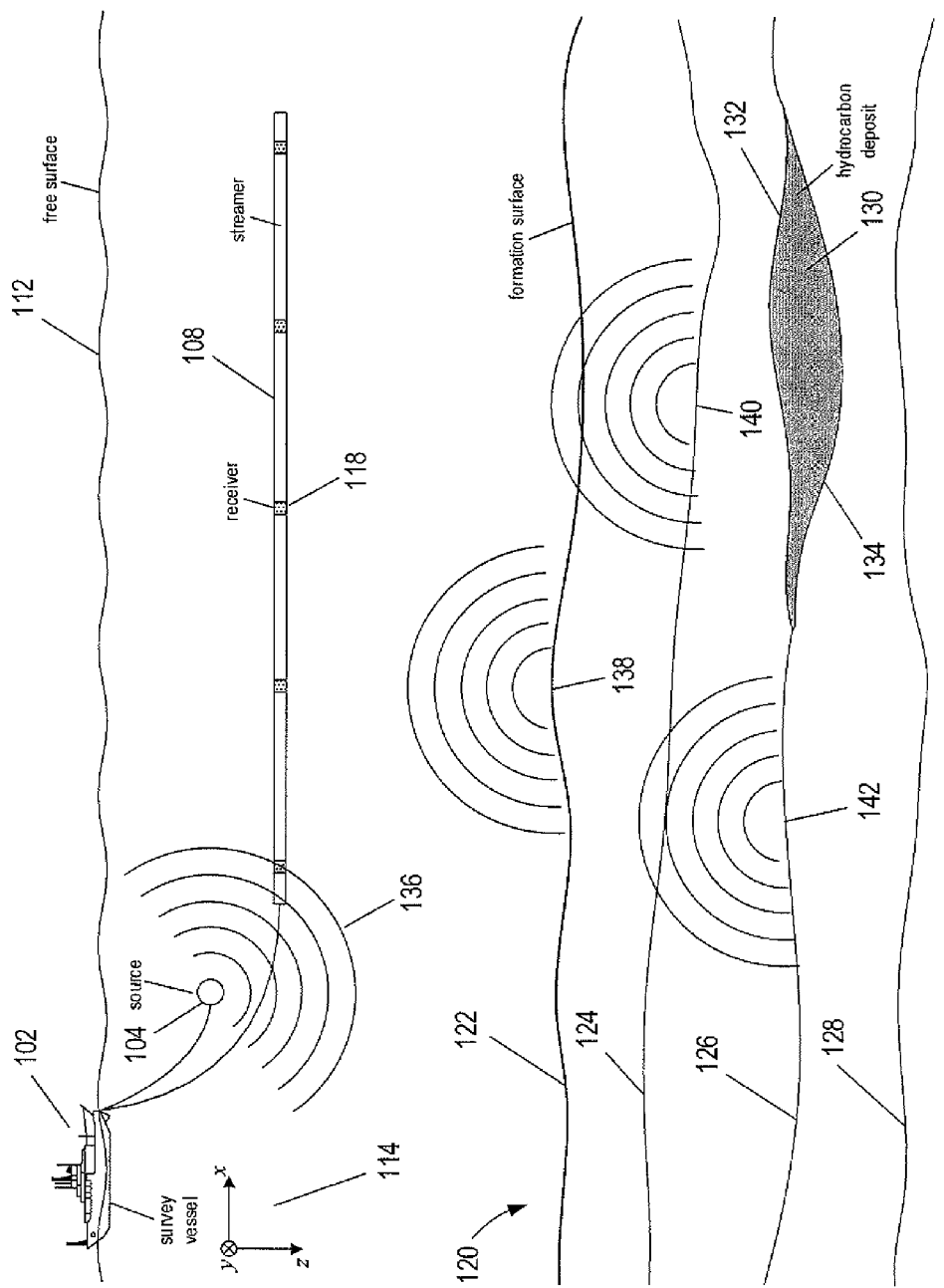
FIGS. 1A-1B show side-elevation and top views, respectively, of an example seismic data acquisition system.
Figure 1B:
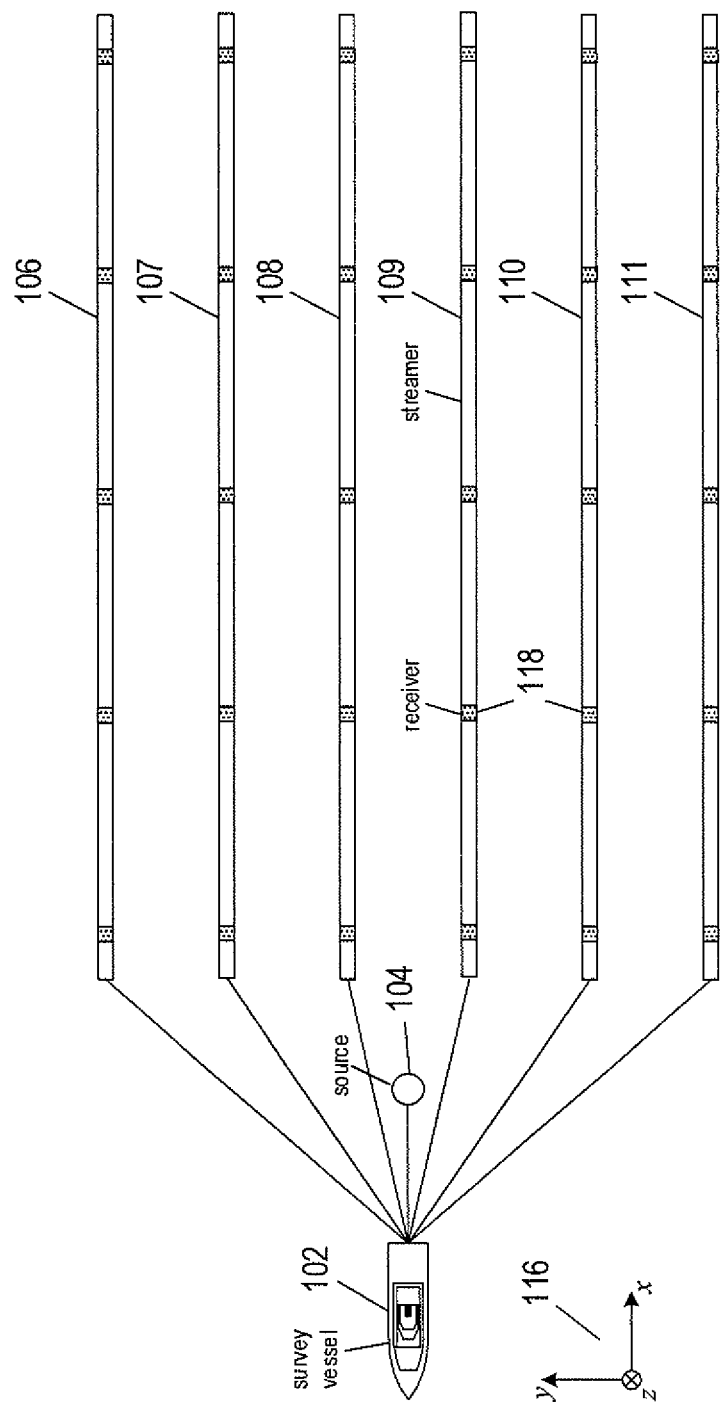

FIGS. 1A-1B show side-elevation and top views, respectively, of an example seismic data acquisition system composed of a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., substantially perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic data acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers (or portions thereof) as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine survey. As the survey vessel 102 moves over the subterranean formation 120, the source 104 may be activated to produce an acoustic signal at spatial and/or temporal intervals. Activation of the source 104 is often called as a "shot." In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wavefronts from the sources may be three-dimensional (e.g., spherical) but are shown in vertical plane cross section in FIG. 1A. The outward and downward expanding portion of the pressure wavefield 136 is called the "primary wavefield," which eventually reaches the formation surface 122 of the subterranean formation 120, at which point the primary wavefield may be partially reflected from the formation surface 122 and partially refracted downward into the subterranean formation 120, becoming elastic waves within the subterranean formation 120. In other words, in the body of water, the acoustic signal is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be considered a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, secondary waves of significant amplitude may be generally emitted from points on or close to the formation surface 122, such as point 138, and from points on or very close to interfaces in the subterranean formation 120, such as points 140 and 142.

The secondary waves may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media are traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
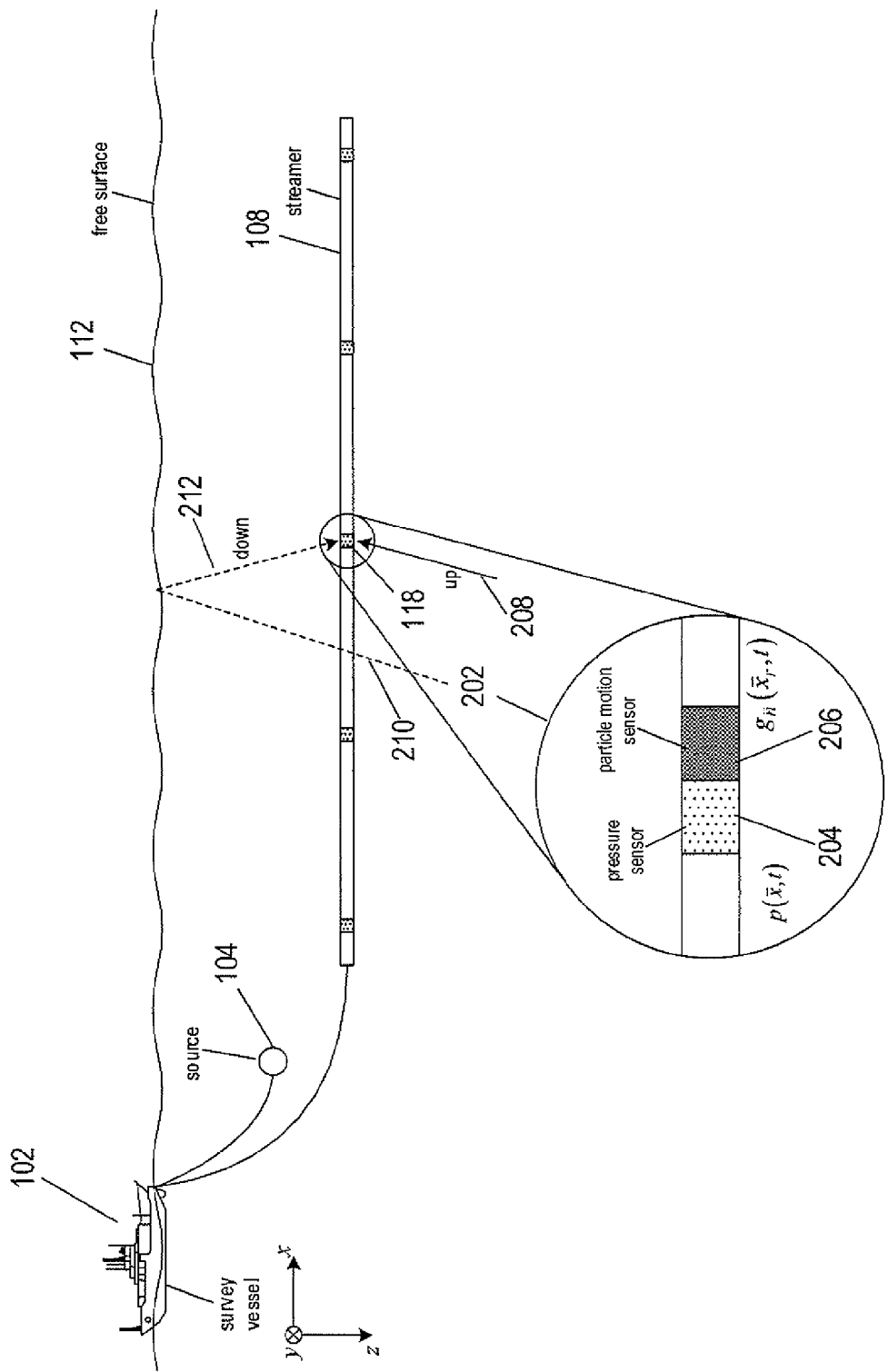
FIG. 2 shows a side-elevation view of a seismic data acquisition system with a magnified view of a receiver.

Each receiver 118 may be a multi-component sensor composed of one or more particle-motion sensors that detect particle motion, velocities, or accelerations over time and a pressure sensor that detects variations in water pressure over time. FIG. 2 shows a side-elevation view of the seismic data acquisition system with a magnified view 202 of the receiver 118. In this example, the magnified view 202 reveals that the receiver 118 is a multi-component sensor composed of a pressure sensor 204 and a particle-motion sensor 206. The pressure sensor may be, for example, a hydrophone. Each pressure sensor may measure changes in water pressure over time to produce pressure data denoted by $p(\vec{x}_r, t)$, where $\vec{x}_r$ represents the Cartesian receiver coordinates $(x_r, y_r, z_r)$ of a receiver, subscript r is a receiver index, and t represents time. The particle-motion sensors may be responsive to water motion. In general, particle-motion sensors detect particle motion in a direction normal to the orientation of the particle-motion sensor and may be responsive to such directional displacement of the particles, velocity of the particles, or acceleration of the particles. A particle-motion sensor that measures particle motion generates particle motion data denoted by $g_{\vec{n}}(\vec{x}_r, t)$. A particle-motion sensor that measures to particle velocity (i.e., particle velocity sensor) generates particle velocity data denoted by $v_{\vec{n}}(\vec{x}_r, t)$. A particle-motion sensor that measures particle acceleration (i.e., accelerometer) generates particle acceleration data denoted by $a_{\vec{n}}(\vec{x}_r, t)$. The data generated by one type of particle-motion sensor may be converted to another type during seismic data processing. For example, particle motion data may be differentiated to obtain particle velocity data, and the particle acceleration data may be integrated to obtain particle velocity data.

The particle-motion sensors are typically oriented so that the particle motion is measured in the vertical direction (i.e., $\vec{n} = (0, 0, z)$) in which case $v_z(\vec{x}_r, t)$ is called the vertical-velocity data and $a_z(\vec{x}_r, t)$ is called the vertical acceleration data. Alternatively, each receiver may include two additional particle-motion sensors that measure particle motion in two other directions, $\vec{n}_1$ and $\vec{n}_2$, that are orthogonal to if $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle-motion sensors that measure particle motion in three orthogonal directions. For example, in addition to having a particle-motion sensor that measures particle velocity in the z-direction to give $v_z(\vec{x}_r, t)$, each receiver may include a particle-motion sensor that measures the wavefield in the in-line direction in order to obtain the inline velocity data, $v_x(\vec{x}_r, t)$, and a particle-motion sensor that measures the wavefield in the cross-line direction in order to obtain the cross-line velocity data, $v_y(\vec{x}_r, t)$. In certain implementations, the particle-motion sensors may be omitted and the receivers may be composed of only pressure sensors.

The streamers 106-111 and the survey vessel 102 may include sensing electronics and data-processing facilities that allow seismic data generated by each receiver to be correlated with the time the source 104 is activated, absolute positions on the free surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored (e.g., electronically or magnetically) on data-storage devices located onboard the survey vessel 102. The pressure data and particle motion, velocity, or acceleration data represent pressure and particle motion wavefields and, therefore, may also be referred to as the pressure wavefield and particle motion, velocity, or acceleration wavefield, respectively.

Returning to FIG. 2, directional arrow 208 represents the direction of an up-going wavefield at the location of receiver 118 and dashed-line arrows 210 and 212 represent a down-going wavefield produced by reflection of an up-going wavefield from the free surface 112 before reaching the receiver 118. In other words, the pressure wavefield measured by the pressure sensors is composed of an up-going pressure wavefield component and a down-going pressure wavefield component, and the particle motion wavefield measured by the particle-motion sensors is composed of an up-going wavefield component and a down-going wavefield component. The down-going wavefield, also called the "ghost wavefield," interferes with the pressure and particle motion data generated by the receivers and creates notches in the seismic data spectral domain as explained below with reference to FIGS. 6 and 7.

As explained above, each pressure sensor 204 and particle-motion sensor 206 generates seismic data that may be stored in data-storage devices located at the receiver or onboard the survey vessel. Each pressure sensor and particle-motion sensor may include an analog-to-digital converter that converts time-dependent analog signals into discrete time series that consist of a number of consecutively measured values called "amplitudes" separated in time by a sample rate. The time series generated by a pressure or particle-motion sensor is called a "trace," which may consist of thousands of samples collected at a typical sample rate of about 1 to 5 ms. A trace is a recording of a subterranean formation response to acoustic energy that passes from an activated source into the subterranean formation where a portion of the acoustic energy is reflected and/or refracted and ultimately detected by a sensor as described above. A trace records variations in a time-dependent amplitude that represents acoustic energy in the portion of the secondary wavefield measured by the sensor. The coordinate location of each time sample generated by a moving sensor may be calculated form global position information obtained from one or more global positioning devices located along the streamers, survey vessel, and buoys and the known geometry and arrangement of the streamers and sensors. A trace generated by a pressure sensor or particle-motion sensor is wavefield data that may be represented as a set of time-dependent amplitudes denoted by:

$$tr_r(t) = \{a_r(t_j)\}_{j=1}^{J} \quad (1)$$

where
j is a time sample index;
J is the number of time samples; and
$a_r(t_j)$ is the pressure or particle motion amplitude at time sample $t_j$.

For example, $p(\vec{x}_r, t)$ is the trace generated by a pressure sensor and $v_{\vec{n}}(\vec{x}_r, t)$ is the trace generated by a particle-motion sensor. Each trace may also include a trace header not represented in Equation (1) that identifies the specific receiver that generated the trace, receiver GPS coordinates, and may include time sample rate and the number of samples.

As explained above, the secondary wavefield typically arrives first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques in order to obtain information about the structure of the subterranean formation.

Figure 3:
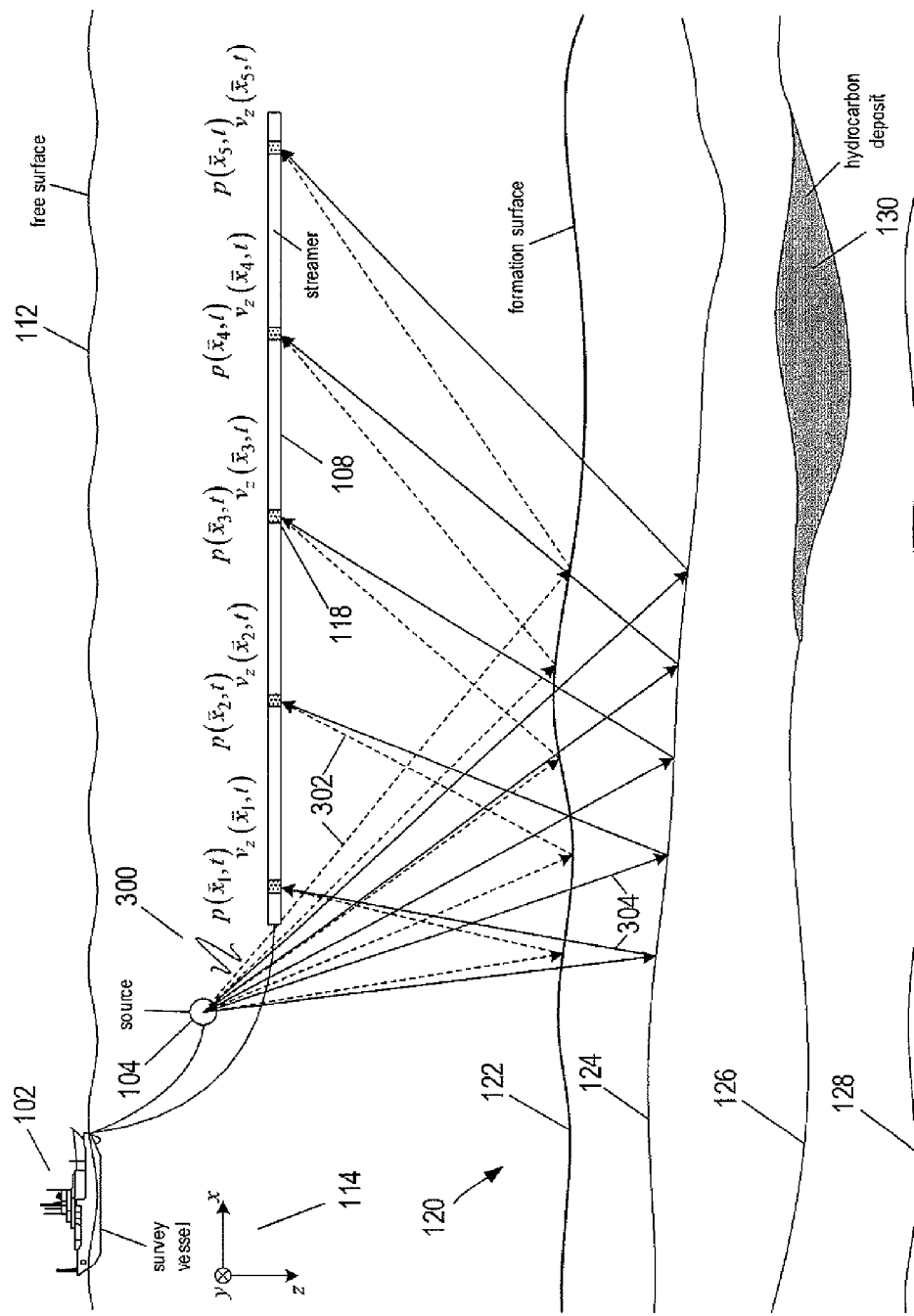
FIG. 3 shows example ray paths that represent paths of an acoustic signal that travels from a source into a subterranean formation.

FIG. 3 shows example ray paths of an acoustic signal 300 that travels from the source 104 into the subterranean formation 120. Dashed-line rays, such as rays 302, represent acoustic energy generated by source 104 and reflected from the formation surface 122 to the receivers 118 located along the streamer 108, and solid-line rays, such as rays 304, represent acoustic energy generated by source 104 and reflected from the interface 124 to the receivers 118 located along the streamer 108. Note that for simplicity of illustration only a handful of ray paths are represented. Each pressure sensor may measure the pressure variation, and each particle-motion sensor may measure the particle motion, velocity, or acceleration of the acoustic energy reflected from the subterranean formation 120 or interfaces therein. In the example of FIG. 3, the particle-motion sensors located at the receivers 118 measure vertical particle velocity of the wavefield emanating from the subterranean formation 120. The pressure data and/or particle motion data generated at each receiver 118 may be time sampled and recorded as separate traces represented by Equation (1). In the example of FIG. 3, the collection of traces generated by the receivers 118 along the streamer 108 for a single activation of the source 104 may be collected to form a "common-shot gather." The traces generated by the receivers located along each of the other five streamers for the same activation may be collected to form separate common-shot gathers, each gather associated with one of the streamers.

Figure 4:
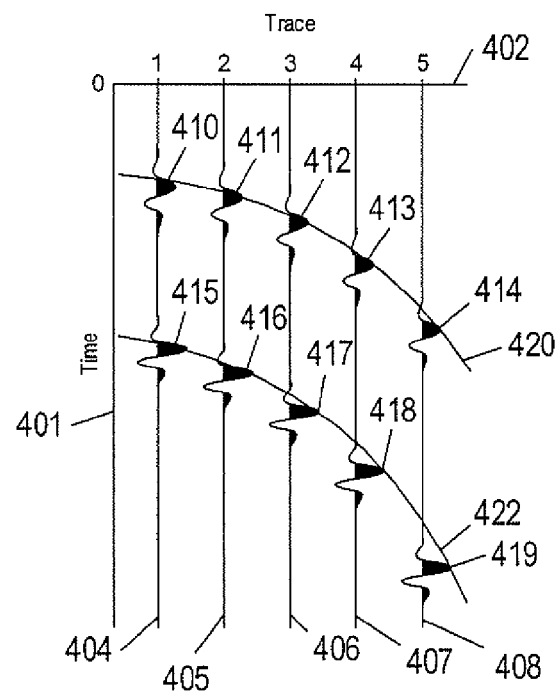
FIG. 4 shows a plot of a synthetic common-shot gather composed of example traces.

FIG. 4 shows a plot of a common-shot gather composed of example traces of the wavefield measured by the five receives located along the streamer 108 shown in FIG. 3. Vertical axis 401 represents time and horizontal axis 402 represents trace numbers with trace "1" representing the seismic data generated by the receiver 118 located closest to the source 104 and trace "5" representing the seismic data generated by the receiver 118 located farthest away from the source 104. The traces 404-408 may represent variation in the amplitude of either the pressure data or the particle motion data measured by corresponding sensors of the five receivers 118. The example traces include wavelets or pulses 410-419 that represent the up-going wavefield measured by the pressure sensors or particle-motion sensors. Peaks, colored black, and troughs of each trace represent changes in the amplitude. The distances along the traces 404-408 from time zero to the wavelets 410-414 represent two-way travel time of the acoustic energy output from the source 104 to the formation surface 122 and to the receivers 118 located along the streamer 108, and wavelets 415-419 represents longer two-way travel time of the acoustic energy output from the source 104 to the interface 124 and to the same receivers 118 located along the streamer 108. The amplitude of the peak or trough of the wavelets 410-419 indicate the magnitude of the reflected acoustic energy recorded by the receivers 118.

The arrival times versus source-receiver offset is longer with increasing source-receiver offset. As a result, the wavelets generated by a formation surface or an interface are collectively called a "reflected wave" that tracks a curve. For example, curve 420 represents the hyperbolic distribution of the wavelets 410-414 reflected from the formation surface 122, which are called a "formation-surface reflected wave," and curve 422 represents the hyperbolic distribution of the wavelets 415-419 from the interface 124, which are called an "interface reflected wave."

Figure 5:
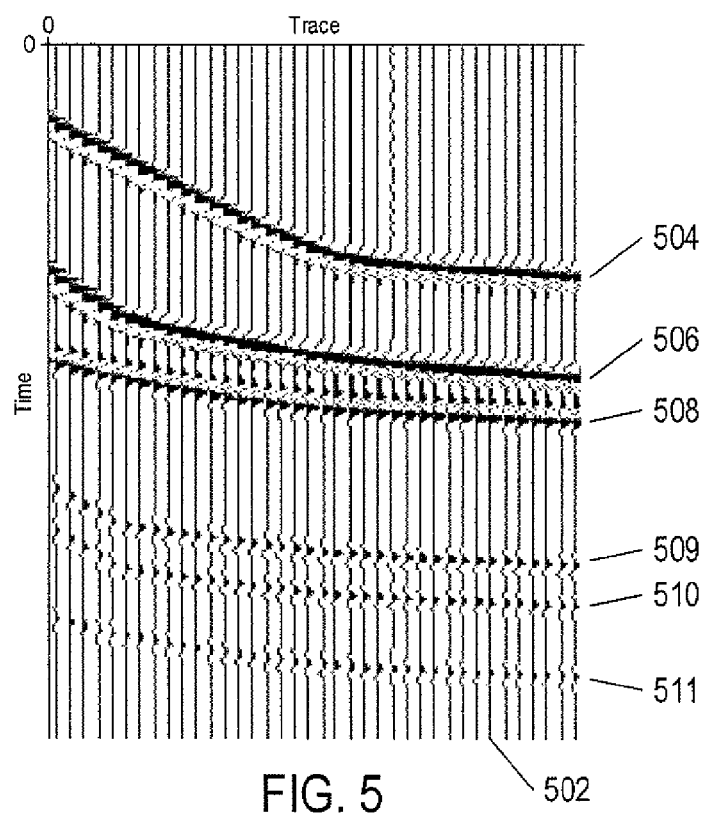
FIG. 5 shows an example expanded view of a synthetic gather composed of 38 traces.

FIG. 5 shows an expanded view of a gather composed of 38 traces. Each trace, such as trace 502, varies in amplitude over time and represents acoustic energy reflected from a subterranean formation surface and five different interfaces within the subterranean formation as measured by a pressure sensor or a particle-motion sensor. In the expanded view, wavelets that correspond to reflections from the formation surface or an interface within the subterranean formation appear chained together to form reflected waves. For example, wavelets 504 with the shortest transit time represent a formation-surface reflected wave, and wavelets 506 represent an interface reflected wave emanating from an interface just below the formation surface. Reflected waves 508-511 represent reflections from interfaces located deeper within the subterranean formation.

A gather is a collection of traces that represents the pressure or vertical-velocity wavefield measured by corresponding pressure sensors or particle-motion sensors, respectively. Each trace of a gather is a portion of the wavefield measured by a particular type of sensor. A gather may by formed by sorting seismic data into any suitable domain for examining the features of a subterranean formation including a common-receiver domain, a common-receiver-station domain, or a common-midpoint domain. A domain is a collection of gathers that share a common geometrical attribute with respect to the seismic data recording locations. For example, the gather shown in FIG. 4 is sorted in a common-shot domain and the gather shown in FIG. 5 is sorted into a common-receiver domain.

In practice, however, pressure and vertical-velocity wavefields do not share the same broad frequency spectrum. Pressure sensors typically have a high signal-to-noise ratio over a broad frequency range, but particle-motion sensors often do not have a high signal-to-noise ratio over the same broad frequency range. For example, particle-motion sensors often detect low-frequency noise created by streamer vibrations that contaminates the low-frequency part of the vertical-velocity data. As a result, particle-motion sensors may have a low signal-to-noise ratio over the low-frequency part of the frequency range.

Figure 6A:
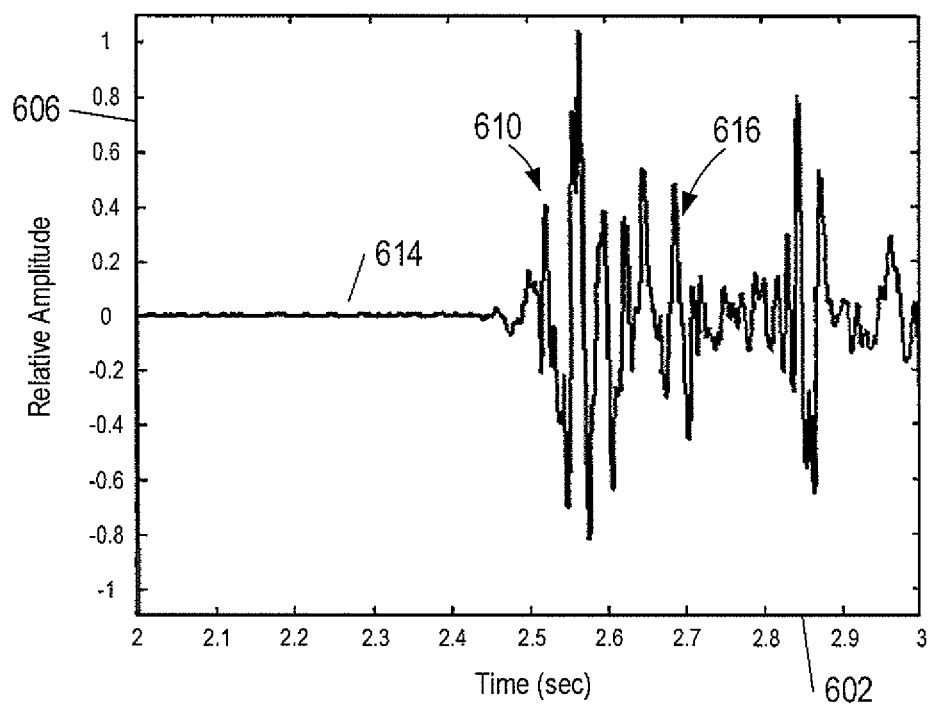
FIGS. 6A-6B show relative amplitude versus time plots of pressure data and vertical-velocity data.
Figure 6B:
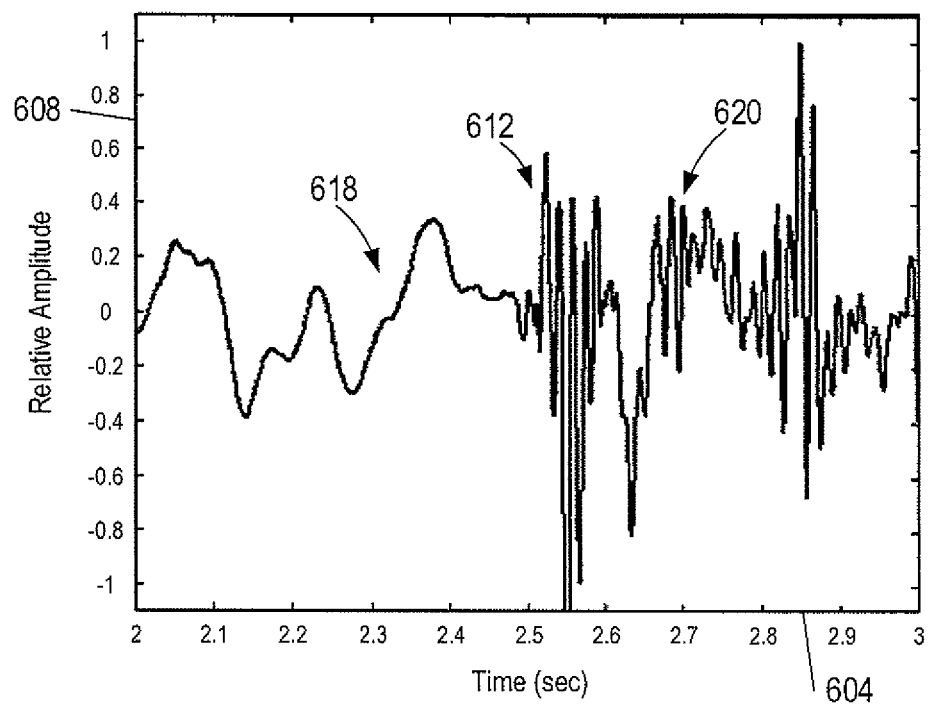

FIGS. 6A-6B show relative amplitude versus time plots of pressure data and vertical-velocity data, respectively, generated by collocated pressure and particle-motion sensors located at a depth of about 13 meters below the free surface. Horizontal axes 602 and 604 represent the same time interval, and vertical axes 606 and 608 represent relative amplitude. In FIG. 6A, waveform 610 represents water pressure changes measured by the pressure sensor in response to an acoustic signal generated by a source. In FIG. 6B, waveform 612 represents the vertical particle velocity changes in the water measured by the particle-motion sensor in response to the same acoustic signal. The waveform 610 exhibits a flat region 614 (i.e., approximately zero amplitude variation) and a rapidly varying region 616 that begins at about 2.45 sec, which corresponds to water pressure changes resulting from the acoustic signal. By contrast, the waveform 612 exhibits a slowly varying region 618 that switches to a rapidly varying region 620 at about 2.45 sec. The slowly varying region 618 is the low-frequency particle motion that may include noise created by streamer vibrations detected by the particle-motion sensor. The rapidly varying region 620 includes the water particle motion resulting from the acoustic signal. The flat region 614 in FIG. 6A indicates that the pressure sensor does not detect the same low-frequency noise.

Low-frequency noise (e.g., vibrational noise) may be observed in the frequency spectra of the vertical-velocity data when the vertical-velocity data is transformed to the frequency domain. The pressure data may be transformed from the space-time ("s-t") domain to the space-frequency ("s-f") domain using a Fast Fourier Transform ("FFT") or a discrete Fourier transform ("DFT"):

$$p(\vec{x}_r, t) \xrightarrow{FT} P(\vec{x}_r, \omega) \qquad (2)$$

where ω is the angular frequency.

Likewise, the vertical-velocity data may be transformed from the s-t domain to the s-f domain using an FFT or a DFT:

$$v_z(\vec{x}_r, t) \xrightarrow{FT} V_z(\vec{x}_r, \omega) \qquad (3)$$

Figure 7:
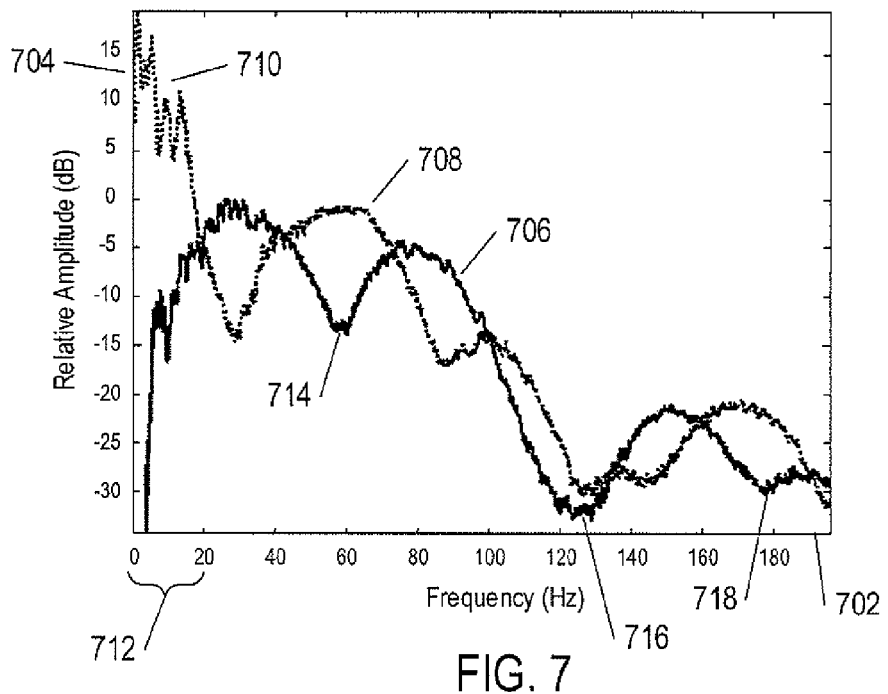
FIG. 7 shows frequency spectra for the pressure and vertical-velocity data shown in FIGS. 6A-6B.

FIG. 7 shows frequency spectra for the pressure and vertical-velocity data shown in FIGS. 6A and 6B. Horizontal axis 702 represents a frequency domain, vertical axis 704 represents relative amplitude, solid curve 706 represents the frequency spectrum of the pressure data (i.e., the pressure spectrum) shown in FIG. 6A, and dotted curve 708 represents the frequency spectrum of the vertical-velocity data (i.e., the vertical-velocity spectrum) shown in FIG. 6B. Low-frequency part 710 of the vertical-velocity spectrum corresponds to the slowly varying low-frequency noise measured by the vertical-velocity sensors. The large relative amplitude of the low-frequency part 710 results from the low-frequency noise created by streamer vibrations, and the corresponding range of frequencies is called the "low-frequency range" 712, which, in this example, ranges from 0 to about 20 Hz. The pressure spectrum 706 and the vertical-velocity spectrum 708 above the low-frequency range 712 exhibit satisfactory signal-to-noise ratios.

Methods and systems described herein attenuate low-frequency particle-motion-sensor noise in the vertical-velocity data. Vertical-velocity data may be recorded in a data-storage device as described above. The vertical-velocity data generated by particle motion sensor may be represented as follows:

$$v_z(\vec{x}_r, t) = v_z^s(\vec{x}_r, t) + n_v(\vec{x}_r, t) \qquad (4)$$

where $v_z^s(\vec{x}_r, t)$ represents signal component of the vertical-velocity data; and $n_v(\vec{x}_r, t)$ represents particle-motion-sensor noise.

Note that the particle-motion-sensor noise includes the low-frequency noise over the low-frequency range. Pressure data $p(\vec{x}_r, t)$ generated by a pressure sensor collocated with the particle motion sensor may also be recorded in a data-storage device as described above. The pressure data $p(\vec{x}, t)$ also includes a pressure-signal component $p^s(\vec{x}_r, t)$ and pressure-sensor noise $n_p(\vec{x}_r, t)$. Methods use the pressure data $p(\vec{x}_r, t)$ to compute approximate vertical-velocity data denoted by $\tilde{v}_z(\vec{x}_r, t)$ as if there was a second particle-motion sensor collocated with the actual particle motion sensor and the pressure sensor. The approximate vertical-velocity data is assumed to include a signal component and a particle-motion-sensor noise component characterized as follows:

$$\tilde{v}_z(\vec{x}_r, t) = \tilde{v}_z^s(\vec{x}_r, t) + \tilde{n}_v(\vec{x}_r, t) \qquad (5)$$

where $\tilde{v}_z^s(\vec{x}_r, t)$ represents signal component of the approximate vertical-velocity data; and $\tilde{n}_v(\vec{x}_r, t)$ represents approximate particle-motion-sensor noise.

The approximate vertical-velocity data $\tilde{v}_z(\vec{x}_r, t)$ approximates the actual vertical-velocity data $\tilde{v}_z(\vec{x}_r, t)$. Methods described below form the approximate particle-motion-sensor noise $\tilde{n}_v(\vec{x}_r, t)$ from the pressure-sensor noise $n_p(\vec{x}_r, t)$. As explained above with reference to FIG. 7, the pressure-sensor noise $n_p(\vec{x}_r, t)$ does not include the low-frequency noise over the low-frequency range 712. A technique for computing the approximate vertical-velocity data $\tilde{v}_z(\vec{x}_r, t)$ based on a normal derivative of the pressure data $p(\vec{x}_r, t)$, and therefore, includes approximate particle-motion-sensor noise $\tilde{n}_v(\vec{x}_r, t)$ from the pressure-sensor noise $n_p(\vec{x}_r, t)$ is described in detail below with reference to FIGS. 9 and 10 and Equations (17)-(27).

Methods and systems use a filter f that gives a minimum difference defined as the vertical-velocity data $v_z(\vec{x}_r, t)$ subtracted from the filter f convolved with the approximate vertical-velocity data, $f * \tilde{v}_z(\vec{x}_r, t)$. The difference is given by:

$$D = f * \tilde{v}_z(\vec{x}_r, t) - v_z(\vec{x}_r, t) = \qquad (6)$$
$$f * \tilde{v}_z^s(\vec{x}_r, t) + f * \tilde{n}_v(\vec{x}_r, t) - v_z^s(\vec{x}_r, t) - n_v(\vec{x}_r, t)$$

where "*" represents convolution.

Ideally, the filter f satisfies the following two conditions: (1) For higher frequencies in which the signal-to-noise ratio of the vertical-velocity data is satisfactory, the filter f may correct for computational (or derivation) inaccuracies, such as non-imaged free-surface variations, in which case Equation (6) implies that $f * \tilde{v}_z^s(\vec{x}_r, t) - v_z^s(\vec{x}_r, t) \approx 0$, when noise is not present or low at higher frequencies. (2) For lower frequencies in which the signal-to-noise ratio of the vertical-velocity data may be low due to noise, as described above with reference to FIG. 7, the filter f suppresses the particle-motion-sensor noise $n_v(\vec{x}_r, t)$.

The filter f makes the signal parts of the vertical-velocity data and the approximate vertical-velocity data approximately the same (i.e., $v_z^s(\vec{x}_r, t) \approx f * \tilde{v}_z^s(\vec{x}_r, t)$). As a result, Equation (6) reduces to the actual particle-motion-sensor noise $n_v(\vec{x}_r, t)$ subtracted from the filter f convolved with the approximate particle-motion-sensor noise $\tilde{n}_v(\vec{x}_r, t)$:

$$D \approx f * \tilde{n}_v(\vec{x}_r, t) - n_v(\vec{x}_r, t) \qquad (7)$$

By adding the difference given by Equation (6) to the vertical-velocity data of Equation (4), the actual particle-motion-sensor noise $n_v(\vec{x}_r, t)$ is replaced by the approximate particle-motion-sensor noise $\tilde{n}_v(\vec{x}_r, t)$ convolved with the filter/to obtain a noise-corrected vertical-velocity data given by:

$$\hat{v}_z(\vec{x}_r, t) = v_z^s(\vec{x}_r, t) + f * \tilde{n}_v(\vec{x}_r, t) \qquad (8)$$

where "^" represents noise corrected.

Equation (8) is the noise-corrected vertical-velocity data composed of the signal component of the vertical-velocity data with the actual particle-motion-sensor noise $n_v(\vec{x}_r, t)$ (which contains the low-frequency noise) replaced by the approximate particle-motion-sensor noise $\tilde{n}_v(\vec{x}_r, t)$ convolved with the filter f. In other words, the noise-corrected vertical-velocity data is composed of the signal component of the vertical-velocity data of Equation (4) and the approximate particle-motion-sensor noise $\tilde{n}_v(\vec{x}_r, t)$ of Equation (5) convolved with the filter f. Calculating the approximate particle-motion-sensor noise $\tilde{n}_v(\vec{x}_r, t)$ based on the pressure-sensor noise $n_p(\vec{x}_r, t)$ is described below. As a result, the noise term $f*\tilde{n}_v(\vec{x}_r, t)$ of Equation (8) does not include the low-frequency noise over the low-frequency range described above with reference to FIG. 7, and the actual signal component of the vertical-velocity data, $n_v^s(\vec{x}_r, t)$, remains intact.

The noise-corrected vertical-velocity data, $\hat{v}_n(\vec{x}_r, t)$, may replace the portion of the vertical-velocity data over the low-frequency range 712 in FIG. 7 provided (1) the pressure data has a satisfactory signal-to-noise ratio over the low-frequency range, (2) the pressure spectrum of the pressure data has no notches over the low-frequency range, and (3) the depth of the pressure sensors are known. As shown in FIG. 7, the relative amplitude of the pressure spectrum 706 exhibits notches 714, 716, and 718 that depend on the depth of the streamer. The notches 714, 716, and 718 are shifted toward lower frequencies as streamer depth increases, and shifted toward higher frequencies as streamer depth decreases. For the example spectra shown in FIG. 7, the pressure spectrum 706 does not have notches in the low-frequency range 712, indicating that the pressure data over the low-frequency range may be used to calculate the approximate vertical-velocity data over the low-frequency range 712.

In one implementation, the low-frequency part of the vertical-velocity data may be replaced by the low-frequency part of the noise-corrected vertical-velocity data as follows. First, the pressure data is transformed from the s-t domain to wavenumber-frequency ("k-f") domain as follows:

$$p(\vec{x}_r, t) \xrightarrow{FT} P(k_x, k_y, \omega | z_r) \quad (9)$$

where
$k_x$ is the x-direction or in-line wavenumber; and
$k_y$ is the y-direction or cross-line wavenumber.

The vertical-velocity data may be transformed from the s-t domain to the k-f domain:

$$v_z(\vec{x}_r, t) \xrightarrow{FT} V_z(k_x, k_y, \omega | z_r) \quad (10)$$

The noise-corrected vertical-velocity data with pressure-sensor noise may be transformed from the s-t domain to the k-f domain:

$$\hat{v}_z(\vec{x}_r, t) \xrightarrow{FT} \hat{V}_z(k_x, k_y, \omega | z_r) \quad (11)$$

A combined vertical-velocity data essentially free of the low-frequency noise is given by:

$$V_z^{combined}(k_x, k_y, \omega | z_r) = \quad (12)$$
$$\begin{cases} \hat{V}_z(k_x, k_y, \omega | z_r) & \omega \leq \omega_{th} \\ W_L \hat{V}_z(k_x, k_y, \omega | z_r) + W_H V_z(k_x, k_y, \omega | z_r) & \omega_{th} < \omega \leq \omega_c \\ V_z(k_x, k_y, \omega | z_r) & \omega_c < \omega \end{cases}$$

where
$\omega_{th}$ is an upper, angular frequency limit on the low-frequency range;
$\omega_c$ is the cutoff angular frequency; and
$W_L$ is a low-pass filter and $W_H$ is a high-pass filter that satisfy a condition $$W_L, W_H = 1 \quad (13)$$

The cutoff frequency $\omega_c$ is less than the second lowest notch frequency in the pressure spectrum, with the lowest notch frequency occurring at DC (i.e., 0 Hz). For example, with reference to FIG. 7, the cutoff frequency should be less than about 60 Hz, which corresponds to the frequency of notch 714. For $\omega_{th} < \omega \leq \omega_c$, the low- and high-pass filters may be frequency dependent:

$$W_L = \frac{\omega_c - \omega}{\omega_c - \omega_{th}} \quad (14a)$$

$$W_H = \frac{\omega - \omega_{th}}{\omega_c - \omega_{th}} \quad (14b)$$

Figure 8:
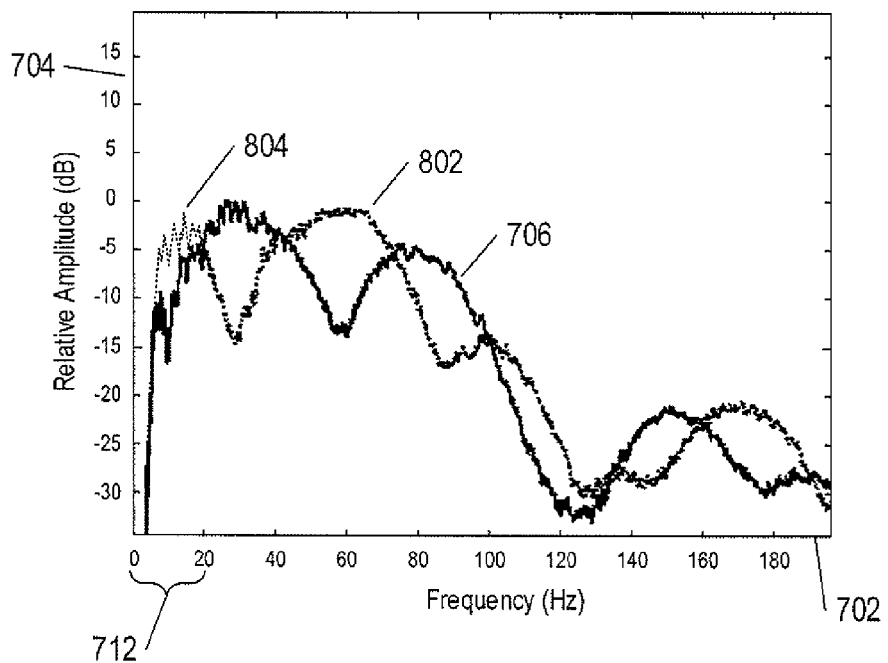
FIG. 8 shows frequency spectra for the pressure and vertical-velocity data with low-frequency noise corrected.

FIG. 8 shows the pressure spectrum 706 and an example combined vertical velocity spectrum 802. The combined vertical velocity spectrum 802 represents Equation (12) which is composed the vertical-velocity spectrum 708 of FIG. 7 for frequencies greater than about 20 Hz and frequency spectrum 804 of the vertical-velocity data with pressure-sensor noise over the low-frequency range 712.

It should also be noted that the vertical-velocity data with pressure-sensor noise $\hat{V}_z(k_x, k_y, \omega | z_r)$ may be used for the full frequency spectrum with a stabilization factor, $\epsilon$, added near notch locations during the inversion in the computation of the vertical-velocity data from the pressure data. For example, the vertical-velocity data with pressure-sensor noise may be given by $\hat{V}_z(k_x, k_y, \omega | z_r) + \epsilon$ for the full frequency spectrum, where $\epsilon \approx 0$ at notch locations and $\epsilon = 0$ away from notch locations.

In another implementation, the vertical-velocity data with pressure-sensor noise may be used in wavefield separation to substantially remove receiver ghost effects as follows. In the k-f domain, the pressure data may be represented as a sum of up-going pressure data and down-going pressure data as follows:

$$P(k_x, k_y, \omega | z_r) = P^{up}(k_x, k_y, \omega | z_r) = P^{down}(k_x, k_y, \omega | z_r) \quad (15)$$

where
$P^{up}(k_x, k_y, \omega | z_r)$ represents the up-going pressure data in the k-f domain; and
$P^{down}(k_x, k_y, \omega | z_r)$ represents the down-going pressure data in the k-f domain (i.e., receiver ghost).

The pressure data and vertical-velocity data with pressure-sensor noise may be used to separate the pressure data into up-going and down-going pressure data in the k-f domain as follows:

$$P^{up}(k_x, k_y, \omega | z_r) = \frac{1}{2}\left[P(k_x, k_y, \omega | z_r) - \frac{\rho\omega}{k_z}\hat{V}_z(k_x, k_y, \omega | z_r)\right] \quad (16a)$$

$$P^{down}(k_x, k_y, \omega | z_r) = \frac{1}{2}\left[P(k_x, k_y, \omega | z_r) + \frac{\rho\omega}{k_z}\hat{V}_z(k_x, k_y, \omega | z_r)\right] \quad (16b)$$

where

ρ is the density of water; and $$k_z = \sqrt{\left(\frac{\omega}{c_0}\right)^2 + k_x^2 - k_y^2}$$

is the z-direction or vertical wavenumber with $c_0$ the speed of sound in water.

The separate up-going and down-going pressure data may be transformed from the k-f domain back to the s-t domain using an inverse FFT ("IFFT"), or inverse ("IDFT"), to obtain corresponding separate up-going and down-going pressure data in the s-t domain. The up-going pressure data may then be used to compute seismic images of the subterranean formation substantially free of the receiver ghost effects contained in the down-going pressure data.

Note that in an alternative implementation, separate up-going and down-going pressure data may also be computed with the vertical-velocity data with pressure-sensor noise, $\hat{V}_z(k_x, k_y, \omega|z_r)$, in Equations (16a) and (16b) may be replaced by the combined vertical-velocity data, $V_z^{combined}(k_x, k_y, \omega|z_r)$, of Equation (12).

Methods and systems compute the approximate vertical-velocity data of Equation (5) based on the pressure data and acoustic reflectivity of the free surface above the streamers when the pressure data is measured. In particular, methods and systems first compute the normal derivative of the pressure data at receiver locations along a streamer based on the pressure data and acoustic reflectivity of the free surface. The normal derivative may then be used to compute the normal derivative of the pressure wavefield at the same receiver locations along the streamer, which, in turn, may be used to compute the approximate vertical-velocity data at the receiver locations along the streamer. Normal derivatives of the pressure data at receiver locations along the streamer are computed based on a Green's second identity formulation of a source-free, closed surface that relates the pressure data measured at the receivers located along the streamer to the normal derivative of the pressure data and includes a Green's function representation of acoustic reflectivity from a spatiotemporally varying free surface above the streamer at the time the pressure data is measured.

Figure 9A:
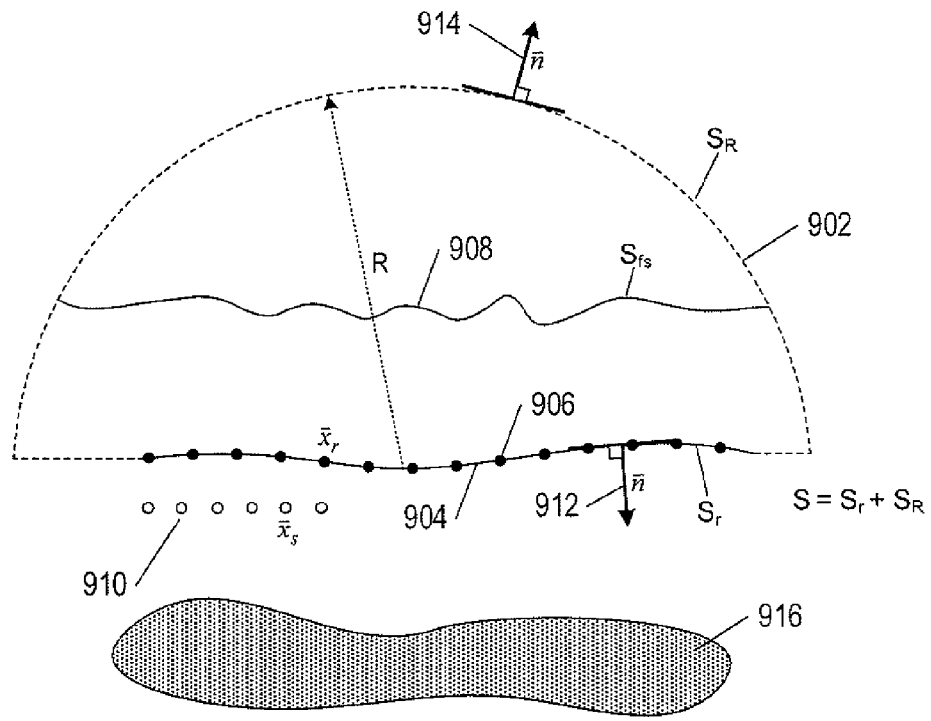
FIGS. 9A-9B show a model geometry used to formulate normal derivative a pressure wavefield.

FIG. 9A shows a mathematical model geometry for a streamer located below a free surface. In FIG. 9A, a closed surface S is composed of a hemispherical cap $S_R$ of radius R represented by a dashed-line curve 902 and a streamer $S_r$ represented by a curve 904 with solid dots, such as solid dot 906, that represent the locations of receivers spaced apart along the length of the streamer $S_r$. Curve 908 represents a profile of the free surface $S_{fs}$ located above the streamer $S_r$ and enclosed by closed surface S. Shaded circles, such as shaded circle 910, represent locations of sources. Note that for the sake of illustration the source are shown below the streamer. Methods described herein are not intended to be limited to the sources located below the streamer. The coordinates of the receivers are denoted by $\vec{x}_r$, where the subscript r represents the r-th receiver of K total receivers located long the streamer, and the coordinates of the sources are denoted by $\vec{x}_s$, where the subscript s represents the s-th source location of L total source locations. Directional arrows 912 and 914 represent normal vectors, denoted by $\vec{n}$, directed orthogonal to the surface S. Shaded region 916 represents a subterranean formation. The shape of the streamer $S_r$, locations of the receives and sources, and shape of the free surface $S_{fs}$ (curve 908) shown in FIG. 9A represent an actual state of the streamer, receivers, sources, and free surface when the pressure data is measured by receivers located along the streamer $S_r$.

Figure 9B:
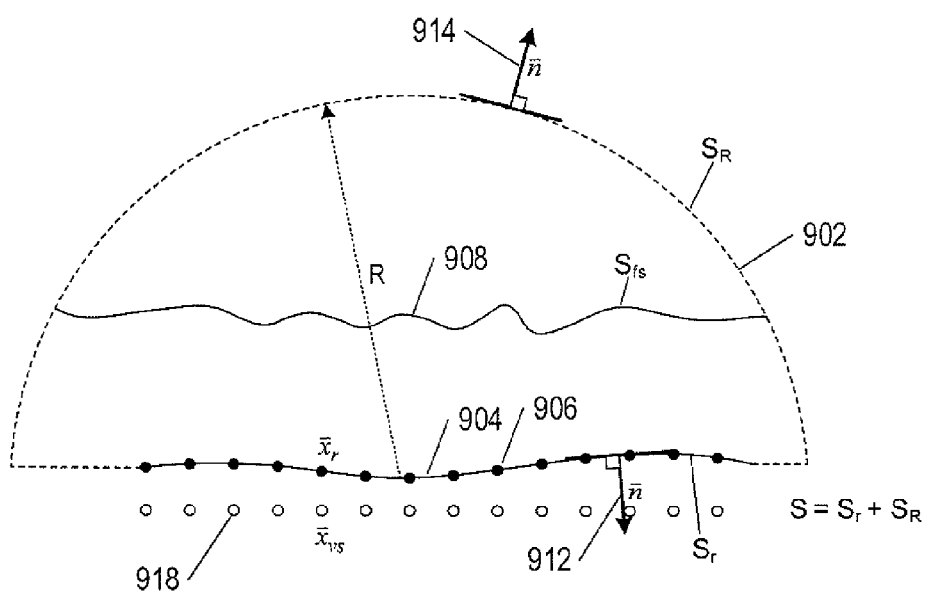

FIG. 9B shows a model geometry used to define a Green's function and its normal derivative based on the model geometry represented in FIG. 9A. The state represented in FIG. 9B includes the same free surface $S_{fs}$ enclosed by the closed surface S as shown in FIG. 9A. Green's function virtual sources are represented by circles, such as circle 918, with virtual source coordinates $\vec{x}_{vs}$. In the example of FIG. 9B, the virtual sources are located outside the volume enclosed by the closed surface S. Alternatively, the virtual sources may be located inside the volume enclosed by the closed surface S or on the closed surface S.

In order to relate the pressure wavefield to normal derivatives of the pressure wavefield at receiver locations along the streamer in the actual state shown in FIG. 9A, the two states represented in FIGS. 9A and 9B are coupled using Green's second identity as follows:

$$\int_V d\vec{x}[P(\vec{x}_r, \vec{x}_s, \omega)\nabla^2 G(\vec{x}_r, \vec{x}_{vs}, \omega) - G(\vec{x}_r, \vec{x}_{vs}, \omega)\nabla^2 P(\vec{x}_r, \vec{x}_s, \omega)] = \oint_S dS\, \vec{n} \cdot [P(\vec{x}_r, \vec{x}_s, \omega)\nabla G(\vec{x}_r, \vec{x}_{vs}, \omega) - G(\vec{x}_r, \vec{x}_{vs}, \omega)\nabla P(\vec{x}_r, \vec{x}_s, \omega)] \quad (17)$$

where $P(\vec{x}_r, \vec{x}_s, \omega)$ represents the pressure data generated by a receiver at coordinate location $\vec{x}_r$ resulting from a source at coordinate location $\vec{x}_s$;

$G(\vec{x}_r, \vec{x}_{vs}, \omega)$ represents a Green's function at coordinate location $\vec{x}_r$ and virtual source coordinate location $\vec{x}_{vs}$; and V represents the volume of the space enclosed by the surface S.

The pressure data, $P(\vec{x}_r, \vec{x}_s, \omega)$, satisfies the Helmholtz wave equation given by $$\left(\nabla^2 + \frac{\omega^2}{c^2(\chi)}\right)P(\vec{x}|\vec{x}_s, \omega) = A(\omega)\delta(\vec{x} - \vec{x}_s) \quad (18a)$$

where $A(\omega)$ results from a Fourier transformation of a source-time function a(t); and $c^2(\chi) = c_0^2/(1-\alpha(\chi))$ with $c_0$ the speed of sound in water and $\alpha(\chi)$ the refractive index.

The Green's function, $G(\vec{x}_r, \vec{x}_{vs}, \omega)$, characterizes reflections from the free surface $S_{fs}$ and is a solution of the acoustic wave equation for a Dirac delta pulse represented by a Dirac delta function as follows:

$$\left(\nabla^2 + \frac{\omega^2}{c^2(\chi)}\right)G(\vec{x}|\vec{x}_{vs}, \omega) = \delta(\vec{x} - \vec{x}_{vs}) \quad (18b)$$

Utilizing the Sommerfeld radiation condition (i.e., R→∞) and substituting the Helmholtz wave Equation (18a) and the acoustic wave Equation (18b) into Equation (17), Equation (17) reduces to a surface integral equation over the surface of the streamer $S_r$ as follows:

$$\alpha P(\vec{x}, \omega) = \int_{S_r} \left[ G(\vec{x}_r, \vec{x}_{vs}, \omega) \frac{\partial P(\vec{x}_r, \vec{x}_s, \omega)}{\partial n} - \frac{\partial G(\vec{x}_r, \vec{x}_{vs}, \omega)}{\partial n} P(\vec{x}_r, \vec{x}_s, \omega) \right] dS_r \quad (19)$$

where $$\frac{\partial}{\partial n} = \vec{n} \cdot \nabla$$

represents the normal derivative directed orthogonal to the streamer $S_r$; and $$\alpha = \begin{cases} 0 & \text{if } \vec{x}_{vs} \text{ is outside } S \\ \frac{1}{2} & \text{if } \vec{x}_{vs} \text{ is at } S \\ 1 & \text{if } \vec{x}_{vs} \text{ is inside } S \end{cases}.$$

The unit normal vector $\vec{n}$ in Equation (19) is given by $$\vec{n} = \frac{-\frac{\partial z(x,y)}{\partial x}\hat{i} - \frac{\partial z(x,y)}{\partial y}\hat{j} + \hat{k}}{\gamma}$$

where $$\gamma = \sqrt{1 + \left[\frac{dz(x,y)}{dx}\right]^2 + \left[\frac{dz(x,y)}{dy}\right]^2};$$

and $z(x, y)$ represents streamer depth.

The streamer depth $z(x, y)$ at points only along the streamer $S_r$ may be interpolated based on the depths generated by depth-measuring devices located along the streamer.

In order to relate the pressure data $P(\vec{x}_r, \vec{x}_s, \omega)$ to the normal derivative of the pressure data $\vec{n} \cdot \nabla P(\vec{x}_r, \vec{x}_s, \omega)$, Equation (17) is solved for the case $\alpha = \frac{1}{2}$. In other words, the coordinates $\vec{x}_{vs}$ of the virtual sources (i.e. the Green's function sources) are moved to the streamer to obtain the following integral equation:

$$\frac{1}{2} P(\vec{x}_{vs}, \omega) = \int_{S_r} \left[ G(\vec{x}_r, \vec{x}_{vs}, \omega) - \frac{\partial G(\vec{x}_r, \vec{x}_{vs}, \omega)}{\partial n} P(\vec{x}_r, \vec{x}_s, \omega) \right] dS_r \quad (20)$$

The surface integral given by Equation (20) may be solved numerically as follows. The surface $S_r$ is broken into K small area elements $dxdy$. The pressure field and its normal derivative are considered constant over each of the small area elements and are equal to their respective values at the center of each element. Mapping the area elements onto a flat surface using $$dS_r = \gamma dxdy$$

and moving the virtual sources to coincide with actual receivers along the streamer $S_r$, Equation (20) may be re-written as a system of equations:

$$\frac{1}{2} P(\vec{x}_{vs}, \omega) = \sum_{\substack{r=1 \\ r \neq vs}}^{K} M_{vs,r} \frac{\partial P(\vec{x}_r, \vec{x}_s, \omega)}{\partial n} - \sum_{\substack{r=1 \\ r \neq vs}}^{K} D_{vs,r} P(\vec{x}_r, \vec{x}_s, \omega) \quad (21)$$

where $$M_{vs,r} = G(\vec{x}_r, \vec{x}_{vs}, \omega) \gamma dxdy;$$

$$D_{vs,r} = \left[ \left( -\frac{\partial z(x,y)}{\partial x}\hat{i} - \frac{\partial z(x,y)}{\partial y}\hat{j} + \hat{k} \right) dxdy \right] \cdot \nabla G(\vec{x}_r, \vec{x}_{vs}, \omega);$$

"·" represents the scalar or dot product;
$\vec{x}_{vs}$ is a vs-th virtual source coordinate along the streamer $S_r$ (i.e. both the virtual sources ($\vec{x}_r^k$) and the actual receivers are at the same location); and
vs=1, . . . , K.

The normal derivative of the pressure $\vec{n} \cdot \nabla P(\vec{x}_r^k, \vec{n}_s, \omega)$ at the K receiver locations may be determined from the set of Equations (21) by first rewriting the set of Equations (21) in matrix form as follows:

$$\frac{1}{2}\vec{P} = \overline{M}\frac{\partial \vec{P}}{\partial n} - \overline{D}\vec{P} \quad (22)$$

where
$\overline{M}$ is called a "monopole matrix" with matrix elements $M_{qk}$;
$\overline{D}$ is called a "dipole matrix" with matrix elements $D_{qk}$; and
$\vec{P} = [P(\vec{x}_1, \vec{x}_s, \omega) \; P(\vec{x}_2, \vec{x}_s, \omega) \; \ldots \; P(\vec{x}_K, \vec{x}_s, \omega)]^T$.

Note that because the virtual sources coincide with the receivers located along the streamer $S_r$, $P(\vec{x}_r, \vec{x}_s, \omega)$ equals $P(\vec{x}_{vs}, \omega)$ for the index r equal to the index vs in Equation (22) and the source coordinates may be suppressed. The diagonal elements of the monopole and dipole matrices $\overline{M}$ and $\overline{D}$ are singular and may be replaced by estimates over the discretization path as follows:

$$M_{rr} = \int_{-dx/2}^{dx/2} \int_{-dy/2}^{dy/2} G(\vec{x}_r, \vec{x}, \omega) \gamma dxdy \quad (23a)$$

$$D_{rr} = \int_{-dx/2}^{dx/2} \int_{-dy/2}^{dy/2} \left[ \left( -\frac{\partial z(x,y)}{\partial x}\hat{i} - \frac{\partial z(x,y)}{\partial y}\hat{j} + \hat{k} \right) dxdy \right] \cdot \nabla G(\vec{x}_r, \vec{x}, \omega) \quad (23b)$$

The normal derivative of the pressure data, $\vec{n} \cdot \nabla P(\vec{x}_r, \omega)$, may be computed as a function of the pressure data, $P(\vec{x}_r, \omega)$, at each of the K receiver locations by solving for $\partial \vec{P}/\partial n$ in Equation (22) to obtain:

$$\frac{\partial \vec{P}}{\partial n} = \overline{M}^{-1}\left[\frac{1}{2}\overline{I} + \overline{D}\right]\vec{P} \quad (24)$$

where $\overline{I}$ is a K×K identity matrix.

Equation (24) gives the normal derivative of the pressure wavefield at each of the K receiver locations, $\vec{n} \cdot \nabla P(\vec{x}_r, \omega)$. Approximate normal particle velocity data at the r-th receiver location along the streamer may be calculated according to:

$$\tilde{V}_{\vec{n}}(\vec{x}_r, \omega) = -\frac{i}{\rho\omega}\vec{n}\cdot\nabla P(\vec{x}_r, \omega) \quad (25)$$

Figure 10:
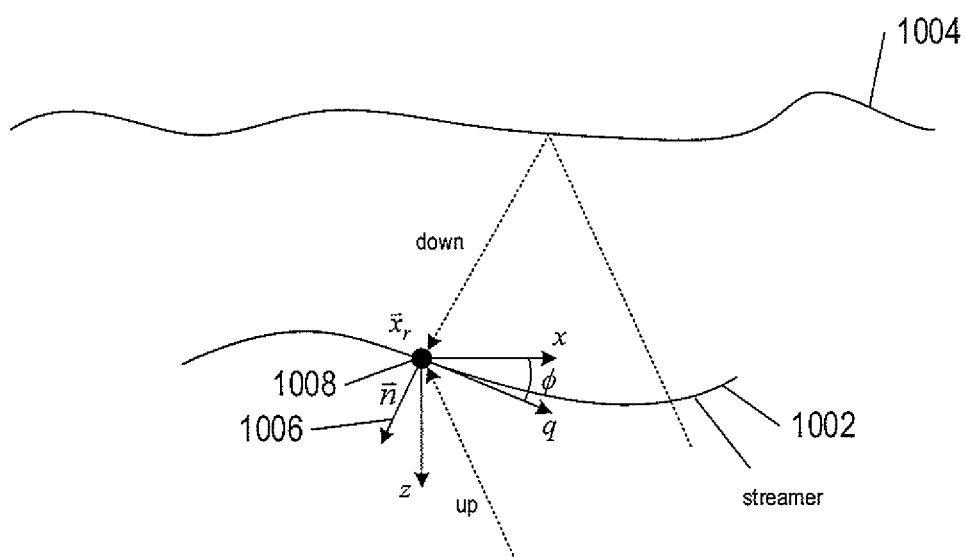
FIG. 10 shows a segment of a streamer and orientation of a receiver.

The approximate normal particle velocity data $\tilde{V}_{\vec{n}}(\vec{x}_r, \omega)$ approximates the normal particle velocity a particle-motion sensor would have measured at the receiver location. Approximate vertical-velocity data $\tilde{V}_z(\vec{x}_r, \omega)$ in the z-direction may be computed from the approximate normal particle velocity data $\tilde{V}_{\vec{n}}(\vec{x}_r, \omega)$ based on the orientation of the receiver shown in FIG. 10. FIG. 10 shows a segment of a streamer 1002 located beneath a free surface 1004 in the xz-plane. A normal vector 1006 to the streamer 1002 at the receiver 1008 is given by:

$$\vec{n} = (n_x, n_z) = (-\sin\phi, \cos\phi) = \left(-\frac{dz_r}{dx}, \frac{dx_r}{dq}\right) \quad (26)$$

The resulting approximate vertical-velocity data for each receiver is given by:

$$\tilde{V}_z(\vec{x}_r, \omega) = \cos\varphi \cdot \tilde{V}_{\vec{n}}(\vec{x}_r, \omega) \quad (27)$$

The approximate vertical-velocity data $\tilde{V}_z(\vec{x}_r, \omega)$ may then be transformed from the s-f domain to the s-t domain using an inverse FFT or inverse DFT to obtain $\tilde{v}_z(\vec{x}_r, t)$, which is the approximate vertical-velocity data of Equation (5). Note that the approximate vertical-velocity data $\tilde{v}_z(\vec{x}_r, t)$ is obtained entirely from the pressure data. As a result, the approximate particle-motion-sensor noise $\tilde{n}_v(\vec{x}_r, t)$ is based the pressure noise $n_p(\vec{x}_r, t)$. The approximate vertical-velocity data $\tilde{v}_z(\vec{x}_r, t)$ may then be convolved with the filter f. By adding the difference given by Equation (6) to the vertical-velocity data of Equation (4), the actual particle-motion-sensor noise $n_v(\vec{x}_r, t)$ in Equation (4) is replaced by the approximate particle-motion-sensor noise $\tilde{n}_v(\vec{x}_r, \omega)$ convolved with the filter f to obtain the noise-corrected vertical-velocity data given by Equation (8).

Computation of the Green's function and normal derivative of the Green's function that appear in Equation (24) are now described. The Green's function is the reflectivity of the free surface $S_{fs}$ and the normal derivative of the Green's function is the normal derivative of the reflectivity at the free surface $S_{fs}$. The free surface $S_{fs}$ is approximated by an approximate frozen free-surface profile as explained in greater detail below.

Figure 11A:
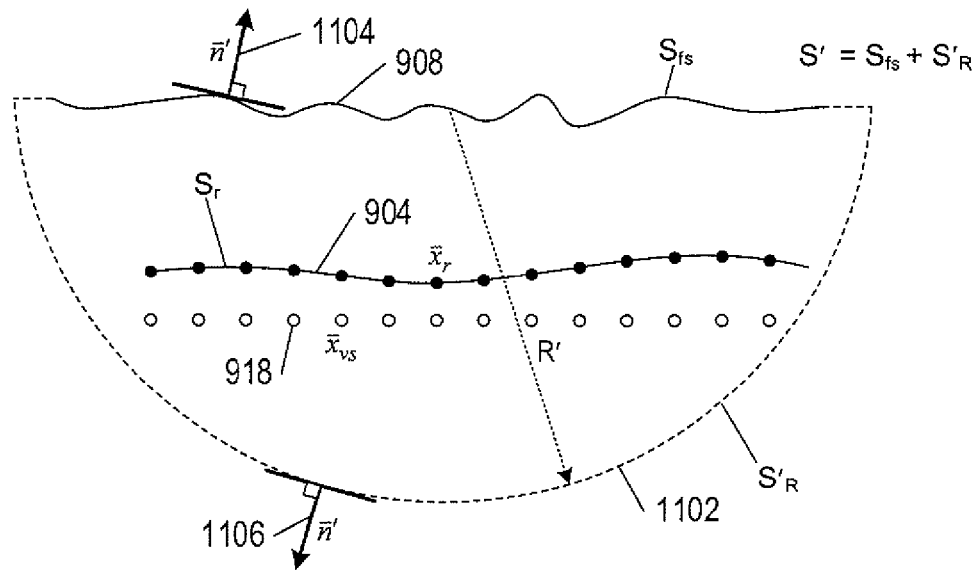
FIGS. 11A-11B show a model geometry used to formulate a Green's function.
Figure 11B:
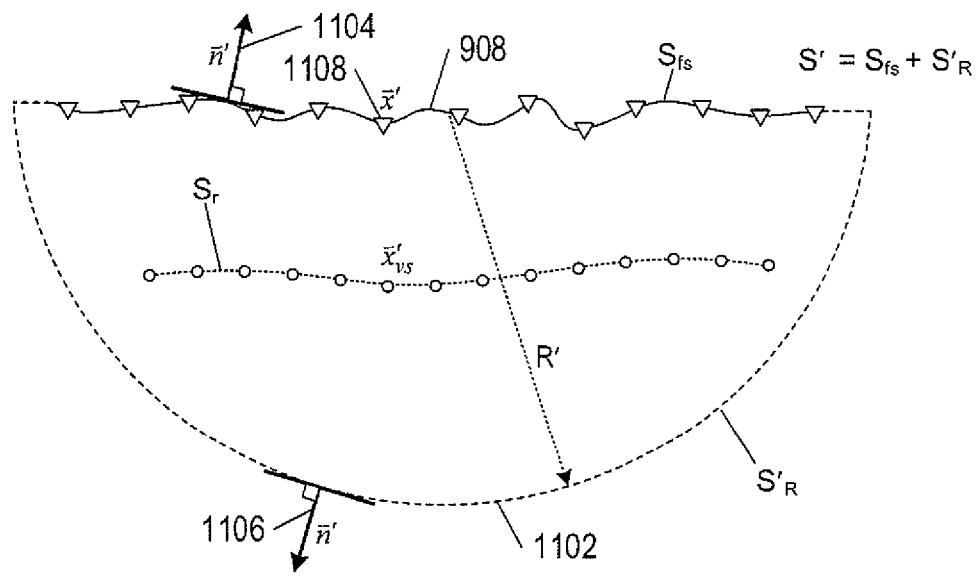

FIGS. 11A-11B shows model geometries used to define a Green's function and its normal derivative. In FIG. 11A, a closed surface S' is composed a hemispherical cap $S'_R$ of radius R' represented by a dashed-line curve 1102 and the free surface $S_{fs}$ represented by the curve 908. Unlike the closed surface S that enclosed the free surface $S_{fs}$ as shown in FIG. 9B, in FIG. 11A the closed surface S' encloses the streamer $S_r$ and the virtual sources with coordinates $\vec{x}_{vs}$. Directional arrows 1104 and 1106 represent unit normal vectors, denoted by $\vec{n}$ ', directed orthogonal to the surface S'. FIG. 11B represents a model state in which the space occupied by the water is homogeneous and the free surface $S_{fs}$ (curve 908) is considered a mathematical boundary surface of the closed surface S'. Coordinates of points located along the free surface $S_{fs}$ are denoted by $\vec{x}$' and are represented by triangles, such as triangle 1108.

A Green's function for the model shown in FIG. 11A may be determined by coupling the two model states represented in FIGS. 11A-11B using Equation (24) with the Sommerfeld radiation condition (i.e., $R' \to \infty$) over the hemispherical cap $S'_R$ and imposing a free-surface boundary condition on the free surface $S_{fs}$ given by $$G(\vec{x}', \vec{x}_{vs}, \omega)|_{\vec{x}=0}$$

in order to obtain $$\beta G(\vec{x}'_{vs}, \omega) = G^0(\vec{x}_{vs}, \vec{x}'_{vs}, \omega) + \int_{S_{fs}} dS_{fs} G^0(\vec{x}', \vec{x}'_{vs}, \omega) \frac{\partial G(\vec{x}', \vec{x}_{vs}, \omega)}{\partial n'} \quad (28a)$$

where
G is the Green's function or reflectivity;

$$\frac{\partial}{\partial n'} = \vec{n}' \cdot \nabla$$

represents the normal derivative directed orthogonal to the free surface $S_{fs}$;

$$\beta = \begin{cases} 1 & \text{if } \vec{x}'_{vs} \text{ is inside } S' \\ 0 & \text{if } \vec{x}'_{vs} \text{ is outside } S' \end{cases};$$

and
$G^0$ is a free space Green's function.
The free-space Green's function that appears in Equation (28a) and in subsequent Equations below is represented in general by:

$$G^0(\vec{y}, \vec{y}', \omega) = \frac{1}{4\pi\|\vec{y}-\vec{y}'\|}\exp(-ik_0\|\vec{y}-\vec{y}'\|) \quad (28b)$$

where
i is the imaginary unit $\sqrt{-1}$;
"$\|\cdot\|$" is Euclidean distance;
$k_0 = \omega/c_0$; and
$\vec{y}$ and $\vec{y}'$ represent general coordinate locations of two different points in the space represented in FIGS. 11A-11B.

The unit normal vector $\vec{n}$' at any point along the free surface in Equation (28a) is given by $$\vec{n}' = \frac{-\frac{\partial f(x,y)}{\partial x}\hat{i} - \frac{\partial f(x,y)}{\partial y}\hat{j} + \hat{k}}{\delta}$$

where $$\delta = \sqrt{1 + \left[\frac{df(x,y)}{dx}\right]^2 + \left[\frac{df(x,y)}{dy}\right]^2};$$

and
f(x, y) approximates the profile or shape of the free surface $S_{fs}$ above the streamer in a frozen-in-time state and is called the approximate frozen free-surface profile.
The shape or profile of the free surface $S_{fs}$ at the time the pressure and vertical-velocity wavefields are measured is assumed to be in a fixed or frozen-in-time state called a "frozen free surface." The approximate frozen free-surface profile f(x, y) approximates the actual, unknown, frozen-in-time state or profile of the free surface above the pressure and particle-motion sensors when the pressure and vertical-velocity wavefields were measured. The approximate frozen free-surface profile f(x, y) is used to compute unit normal vector $\vec{n}'$ at any point along the frozen free surface. Methods for computing f(x, y) are described below with reference to FIGS. 12-17 and Equations (31)-(47). Note that the Green's function $G(\vec{x}', \vec{x}_{vs}, \omega)$ represents the reflectivity resulting from two sources. The first source is the Dirac delta pulse and the second source is the free surface. A technique for computing the Green's function and the normal derivative of the Green's function at a streamer locations $\vec{x}_r$ based on Equation (28a) is summarized as follows. First, the parameter $\beta$ in Equation (28a) is set to one. Next, letting $\vec{x}'_{vs}$ approach the free surface and using the boundary condition $G(\vec{x}'_{vs}, \omega)|_{\vec{x}'_{vs}=\vec{x}_{fs}}$, Equation (28a) becomes the reflectivity at the free surface as follows:

$$G^0(\vec{x}_{vs}, \vec{x}_{fs}, \omega) = \int_{S_{fs}} dS_{fs} G^0(\vec{x}', \vec{x}_{fs}, \omega) \frac{\partial G(\vec{x}', \vec{x}_{vs}, \omega)}{\partial n'} \quad (29a)$$

Next, the computed normal derivative of the Green's function at the free surface given by Equation (29a) is replaced in Equation (28a) and then setting $\beta=1$ and $\vec{x}_{fs}=\vec{x}_r$, the Green's function (i.e., reflectivity) at the streamer location $\vec{x}_r$ is given by:

$$G(\vec{x}_r, \omega) = G^0(\vec{x}_{vs}, \vec{x}_r, \omega) + \int_{S_{fs}} dS_{fs} G^0(\vec{x}', \vec{x}_r, \omega) \frac{\partial G(\vec{x}', \vec{x}_{vs}, \omega)}{\partial n'} \quad (29b)$$

Finally, taking the normal derivative of the Green's function (i.e., normal derivative of the reflectivity) given by Equation (29b) at the streamer locations $\vec{x}_r$ gives $$\frac{\partial G(\vec{x}_r, \omega)}{\partial n} = \quad (29c)$$

$$\frac{\partial G^0(\vec{x}_{vs}, \vec{x}_r, \omega)}{\partial n} + \int_{S_{fs}} dS_{fs} \frac{\partial G^0(\vec{x}', \vec{x}_r, \omega)}{\partial n} \frac{\partial G(\vec{x}', \vec{x}_{vs}, \omega)}{\partial n'}$$

The Green's function $G(\vec{x}_r, \omega)$ in Equation (29b) represents the reflectivity at receiver locations along the streamer and $\vec{n} \cdot \nabla G(\vec{x}_r, \omega)$ in Equation (29c) represents the normal derivative of the reflectivity at receiver locations along the streamer.

The Green's function $G(\vec{x}_r, \omega)$ and the normal derivative $\vec{n} \cdot \nabla G(\vec{x}_{vs}, \omega)$ may be computed numerically and substituted into Equation (24). The surface $S_{fs}$ is broken into K small area elements dxdy. The Green's function and the normal derivative of the Green's function are considered constant over each small area element and are equal to their respective values at the center of each small area element. By mapping curved small area elements onto a flat surface $$dS_{fs} = \delta dxdy$$

Equation (29a) may be rewritten at the receiver coordinates as $$G^0(\vec{x}_{vs}, \vec{x}_r, \omega) = \quad (30a)$$

$$\begin{cases} \sum_{k=1}^{K} \delta dxdy G^0(\vec{x}'_k, \vec{x}_r, \omega) \frac{\partial G(\vec{x}'_k, \vec{x}_{vs}, \omega)}{\partial n'}, k \neq r \\ \int_{-dx/2}^{dx/2}\int_{-dy/2}^{dy/2} \delta dxdy G^0(\vec{x}'_k, \vec{x}_r, \omega) \frac{\partial G(\vec{x}'_k, \vec{x}_{vs}, \omega)}{\partial n'}, k = r \end{cases}$$

Equation (29b) may be rewritten as $$G(\vec{x}_r, \omega) = G^0(\vec{x}_{vs}, \vec{x}_r, \omega) + \sum_{k=1}^{K} \delta dxdy G^0(\vec{x}'_k, \vec{x}_r, \omega) \frac{\partial G(\vec{x}'_k, \vec{x}_{vs}, \omega)}{\partial n'} \quad (30b)$$

and Equation (29c) may be rewritten as $$\frac{\partial G(\vec{x}_r, \omega)}{\partial n} = \quad (30c)$$

$$\frac{\partial G^0(\vec{x}_{vs}, \vec{x}_r, \omega)}{\partial n} + \sum_{k=1}^{K} \delta dxdy \frac{\partial G^0(\vec{x}'_k, \vec{x}_r, \omega)}{\partial n} \frac{\partial G(\vec{x}'_k, \vec{x}_{vs}, \omega)}{\partial n'}$$

Equations (30a)-(30c) may be used to compute the Green's function G, which is then substituted into Equation (24) to compute the normal derivative of the pressure data.

Computing an approximate frozen free-surface profile is now described with reference to FIGS. 12-16. In the following description the y-spatial component is suppressed in order to simplify the description. Note that in practice the y-spatial component (i.e., cross-line) may be included. In other words, in the discussion that follows, the three spatial coordinates of the pressure data $p(x_r, y_r, z_r, t)$ are reduced to two spatial coordinates, $p(x_r, z_r, t)$, and the three spatial coordinates of the measured particle-velocity data $v_{\vec{n}}(x_r, y_r, z_r, t)$ are reduced to two spatial coordinates, $v_{\vec{n}}(x_r, y_r, z_r, t)$. The reduction to two spatial coordinates gives clear insight while preserving the main features of the method.

As described above with reference to FIG. 2, the pressure data $p(x_r, z_r, t)$ is composed of an up-going pressure component and a down-going pressure component, and the particle-velocity data $v_{\vec{n}}(X_r, Z_r, t)$ is also composed of an up-going particle-velocity component and a down-going particle-velocity component. The down-going pressure data and the down-going particle-velocity data are receiver ghosts. Wavefield decomposition is performed on the pressure data and particle-velocity data for frequencies greater than the upper frequency, $f_{th}$, of the low-frequency range. For example, the upper frequency, $f_{th}$, would be equal to 20 Hz for the low-frequency range described above with reference to FIG. 7.

Figure 12A:
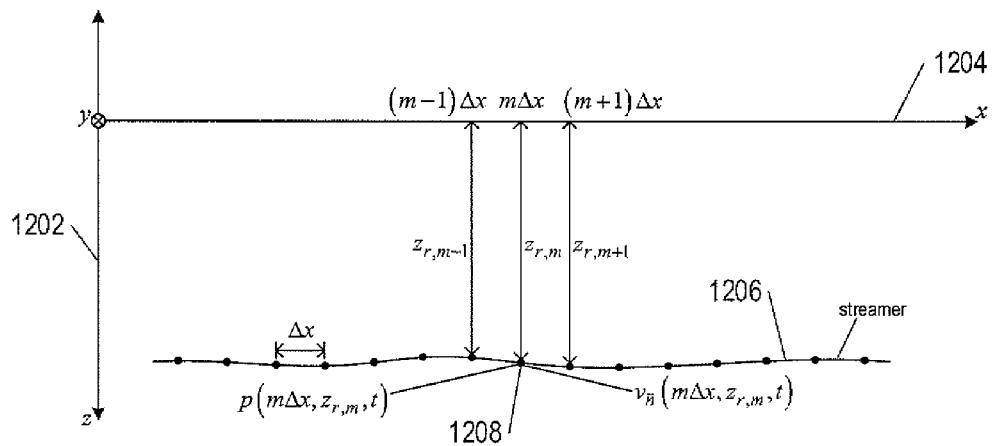
FIGS. 12A-12B show coordinates used in wavefield separation.
Figure 12B:
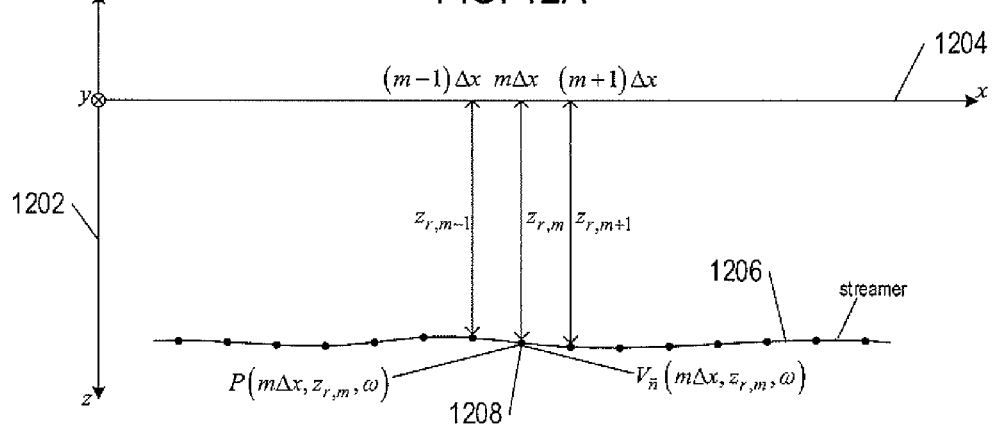

FIGS. 12A-12B show coordinates used to apply wavefield separation to a pressure wavefield measured by receivers located along a streamer. In FIGS. 12A-12B, vertical axis 1202 is a z-coordinate axis that represents the depth or z-spatial dimension and horizontal axis 1204 is an x-coordinate axis that represents the in-line direction. The "0" z-spatial coordinate corresponds to a plane tangent at z=0 to the geoid. FIGS. 12A-12B shows a streamer 1206 with solid dots, such as solid dot 1208, that represent receivers spaced by approximately Δx along the streamer 1206. The pressure data and normal particle-velocity data measured by collocated pressure and particle-motion sensors are denoted by $p(m\Delta x, z_{r,m}, t)$ and $v_{\vec{n}}(m\Delta x, z_{r,m}, t)$, where the in-line spatial coordinate is mΔx with channel index m=0, . . . , −1 and M is the number of channels. The pressure data and measured particle-velocity data associated with each receiver are transformed from the s-t domain to the s-f domain using an FFT or a DFT:

$$p(m\Delta x, z_{r,m}, t) \xrightarrow{FT} P(m\Delta x, z_{r,m}, \omega) \quad (31a)$$

$$v_{\vec{n}}(m\Delta x, z_{r,m}, t) \xrightarrow{FT} V_{\vec{n}}(m\Delta x, z_{r,m}, \omega) \quad (31b)$$

FIG. 12B shows an example plot of the streamer 1206 with the pressure and particle-velocity data associated with receiver 1208 transformed to the s-f domain.

After the pressure and velocity wavefields associated with each receiver have been transformed from the s-t domain to the s-f domain, the pressure data and the velocity data are combined to produce an up-going pressure component at the geoid (i.e., z=0) in the k-f domain. The up-going pressure wavefield at the geoid (i.e., zero depth) is computed from the pressure and particle-velocity wavefields as follows:

$$P^{up}(k_x, \omega \mid z = 0) = \quad (32a)$$

$$\frac{\Delta k}{-2jk_z} \sum_{m=0}^{M-1} \{j\omega\rho V_{\vec{n}}^{th}(m\Delta x, z_{r,m}, \omega)e^{(jk_x m\Delta x - jk_z z_{r,m})} +$$

$$P(m\Delta x, z_{r,m}, \omega)e^{(jk_x m\Delta x - jk_z z_{r,m})}(jk_x n_x - jk_z n_z)\}$$

where $k_z$ is the vertical wavenumber in the z-direction given by:

$$k_z = \sqrt{\left(\frac{\omega}{c}\right)^2 - k_x^2}$$

with c the speed of sound in the fluid;

$k_x$ is the horizontal wavenumber in the x-spatial direction m is the dual sensor or channel index;

M is the total number of dual sensors located along the streamer;

ρ is the density of the fluid;

$z_{r,m}$ is the interpolated depth of the streamer at the $m^{th}$ dual sensor;

$n_x$ is the x-component of the normal vector $\vec{n}$;

$n_z$ is the z-component of the normal vector and $\vec{n}$; and $V_{\vec{n}}^{th}(m\Delta x, z_{r,m}, \omega)$ is the velocity wavefield for angular frequencies greater than an angular threshold frequency $\omega_{th}$ (i.e., $\omega_{th}=2\pi f_{th}$).

The particle-velocity data $V_{\vec{n}}^{th}(m\Delta x, z_{r,m}, \omega)$ is the particle-velocity data $V_{\vec{n}}(m\Delta x, z_{r,m}, \omega)$ for angular frequencies greater than the angular upper frequency $\omega_{th}$. Analogously, the down-going pressure wavefield in the k-f domain at z=0 is computed in a similar manner by:

$$P^{down}(k_x, \omega \mid z = 0) = \quad (32b)$$

$$\frac{\Delta x}{2jk_z} \sum_{m=0}^{M-1} \{j\omega\rho V_{\vec{n}}^{th}(m\Delta x, z_{r,m}, \omega)e^{(jk_x m\Delta x + jk_z z_{r,m})} +$$

$$P(m\Delta x, z_{r,m}, \omega)e^{(jk_x m\Delta x + jk_z z_{r,m})}(jk_x n_x + jk_z n_z)\}$$

Note that the up-going pressure wavefield, $P^{up}$, and the down-going pressure wavefield, $P^{down}$, are computed from the pressure data, P, and the particle-velocity data, $V_{\vec{n}}^{th}$, for the M receivers along the streamer 1206.

Figure 13:
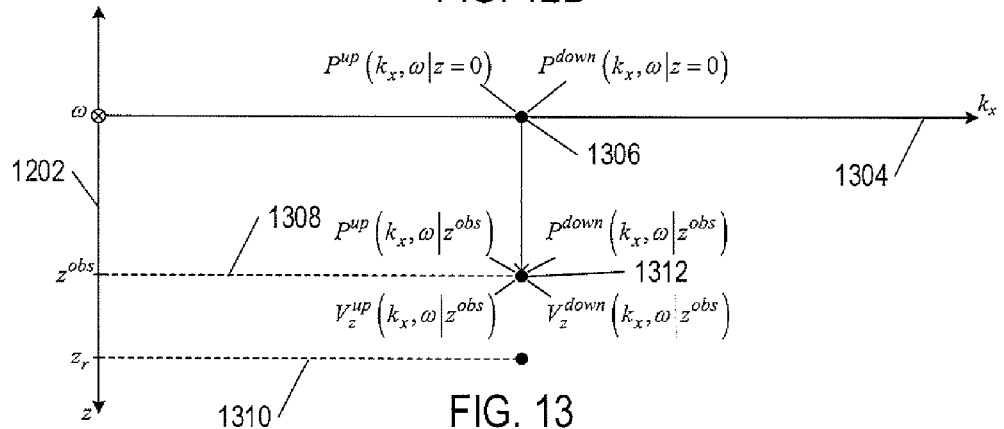
FIG. 13 shows an example plot of pressure wavefield and velocity wavefield in the k-f domain.

FIG. 13 shows an example plot of pressure wavefield and velocity wavefield in the k-f domain. Horizontal axis 1304 represents the wavenumber $k_x$ coordinate axis. Note that the angular frequency axis to is perpendicular to the $k_x$z-plane. Solid dot 1306 represents a point $(k_x, \omega|z=0)$ in the k-f domain on the $k_x$ coordinate axis 1304, which are the coordinates of up-going and down-going wavefield wavefields $P^{up}(k_x, \omega|z=0)$ and $P^{down}(k_x, \omega|z=0)$.

After the up-going and down-going pressure wavefields at the geoid have been determined in the k-f domain, the up-going and down-going pressure wavefield wavefields are shifted to an observation level at a depth, $z^{obs}$, between the geoid and the depth of the receiver $z_r$. In FIG. 13, dashed line 1308 represents the observation level $z^{obs}$ between the geoid and the depth of the receiver $z_r$ 1310. The up-going pressure wavefield at a point $(k_x, z^{obs-})$ 1312 along the observation level $z^{obs}$ 1308 is calculated from $P^{up}(k_x, \omega|z=0)$ by:

$$P^{up}(k_x,\omega|z^{obs}) = P^{up}(k_x,\omega|z=0)e^{jk_z z^{obs}} \quad (33a)$$

Likewise, the down-going pressure wavefield at the point $(k_x, \omega|z^{obs})$ 1312 is calculated by:

$$P^{down}(k_x,\omega|z^{obs}) = P^{down}(k_x,\omega|z=0)e^{-jk_z z^{obs}} \quad (33b)$$

The up-going vertical velocity wavefield at the point $(k_x, \omega|z^{obs})$ 1312 is calculated from the up-going pressure wavefield $P^{up}(k_x, \omega|z^{obs})$ by:

$$V_z^{up}(k_x, \omega \mid z^{obs}) = -\frac{k_z}{\rho\omega} P^{up}(k_x, \omega \mid z^{obs}) \quad (34a)$$

The down-going vertical velocity wavefield at the point $(k_x, \omega|z^{obs})$ 1312 is calculated from the down-going pressure wavefield $P^{down}(k_x, \omega|z^{obs})$ by:

$$V_z^{down}(k_x, \omega \mid z^{obs}) = \frac{k_z}{\rho\omega} P^{down}(k_x, \omega \mid z^{obs}) \quad (34b)$$

In other embodiments, calculation of the free-surface profile can also be accomplished using the up-going and down-going vertical velocity wavefields.

In summary, wavefield decomposition may be described as the process of transforming the pressure data $p(m\Delta x, z_{r,m}, t)$ and particle-velocity data $v_{\vec{n}}(m\Delta x, z_{r,m}, t)$ measured at the corresponding dual sensors of each receiver in the s-t domain, as shown in FIG. 12A, into a down-going pressure wavefield $p^{down}(k_x, \omega|z^{obs})$ an up going pressure wavefield $P^{up}(k_x, \omega|z^{obs})$, a down-going vertical-velocity wavefield $V_z^{down}(k_x, \omega|z^{obs})$ and an up-going vertical-velocity wavefield $V_z^{up}(k_x, \omega|z^{obs})$ in the k-f domain at an observation level $z^{obs}$, as shown in FIG. 13. The $P^{up}$, $P^{down}$, $V_z^{up}$, and $V_z^{down}$ are computed from the pressure wavefield P and the velocity wavefield $V_{\vec{n}}^{th}$ above the threshold frequency $\omega_{th}$ described above with reference to FIG. 7.

Note that a three-spatial-dimensional version of the up-going and down-going pressure wavefields and the up-going and down-going vertical velocity wavefields can be obtained by replacing the vertical wavenumber $k_z$ by:

$$k_z = \sqrt{\left(\frac{\omega}{c}\right)^2 - k_y^2 - k_x^2}$$

where $k_y$ is the horizontal wavenumber in the y-spatial direction.

Figure 14A:
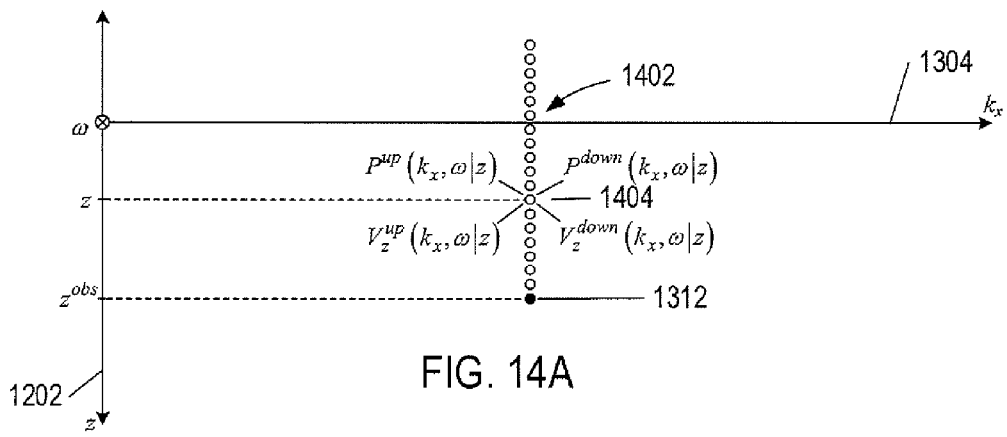
FIGS. 14A-14C show a process of computing an approximate free-surface profile.
Figure 14B:
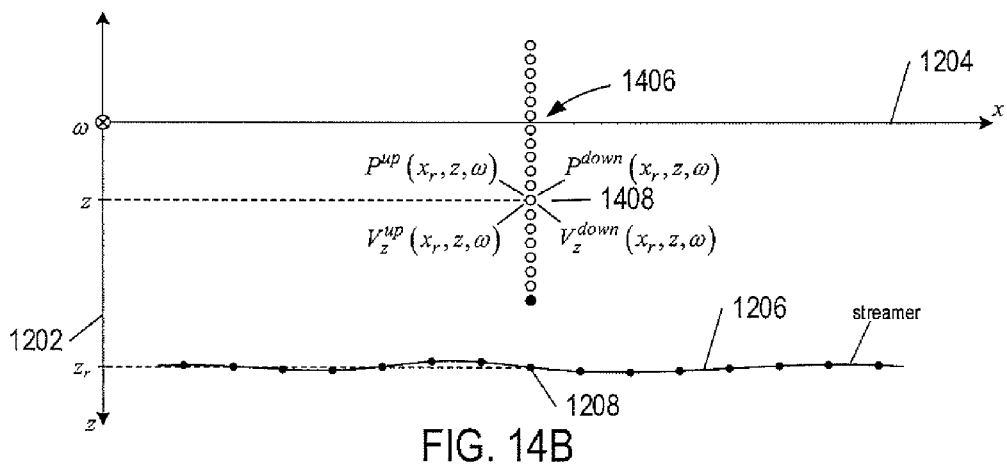
Figure 14C:
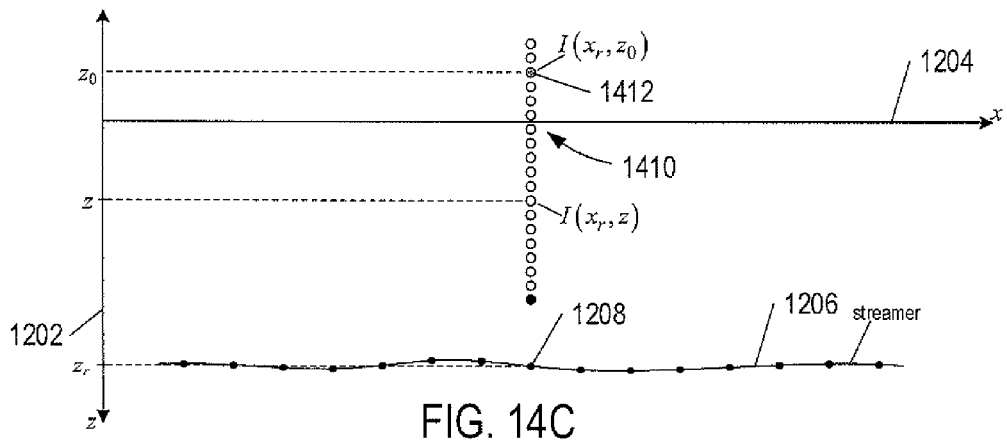

FIGS. 14A-14C show three different plots in a process of computing an approximate free-surface profile of an actual free surface. An approximate free-surface profile is calculated by first computing up-going and down-going pressure wavefield, or the up-going and down-going vertical-velocity wavefield, for a series of depth levels that extend upward from the observation level $z^{obs}$ 1308. FIG. 14A shows a series of extrapolation points 1402 that represents coordinates $(k_x, \omega|z)$ that extend upward from the point $(k_x, \omega|z^{obs})$ 1312 to beyond the z=0 (i.e., geoid) $k_x$ coordinate axis 1304, where the frequency $\omega$ and wavenumber $k_x$ coordinates are the same for each point and the z-coordinates (i.e., depth levels) increase incrementally from the observation level $z^{obs}$ in a process called "extrapolation." The extrapolated up-going pressure wavefield is calculated at each extrapolation point by:

$$P^{up}(k_x,\omega|z)=P^{up}(k_x,\omega|z^{obs})e^{-jk_z(z^{obs}-z)} \quad (35a)$$

where z is a coordinate value in the series of extrapolation points 1402.
The extrapolated down-going pressure wavefield is also calculated at each extrapolation point:

$$P^{down}(k_x,\omega|z)=P^{down}(k_x,\omega|z^{obs})e^{-jk_z(z^{obs}-z)} \quad (35b)$$

In another implementation, the extrapolated up-going vertical velocity wavefield at each extrapolation point is calculated by:

$$V_z^{up}(k_x,\omega|z)=V_z^{up}(k_x,\omega|z^{obs})e^{-jk_z(z^{obs}-z)} \quad (36a)$$

The extrapolated down-going vertical velocity wavefield at each extrapolation point is calculated by:

$$V_z^{down}(k_x,\omega|z)=V_z^{down}(k_x,\omega|z^{obs})e^{-jk_z(z^{obs}-z)} \quad (36b)$$

After extrapolated up-going and down-going pressure wavefields, or extrapolated up-going and down-going vertical velocity wavefields, have been calculated in the k-f domain, an inverse Fourier transform is used to transform the extrapolated up-going and down-going pressure wavefields and/or extrapolated up-going and down-going vertical velocity wavefields into the s-f domain.

FIG. 14B shows a series of extrapolation points 1406 with associated up-going and down-going wavefields obtained from transforming the series of extrapolation points 1402 in the k-f domain of FIG. 14A into the s-f domain. Inverse transformation of the pressure wavefields are represented by:

$$P^{up}(k_x,\omega|z) \xrightarrow{IFT} P^{up}(x_r, z, \omega) \quad (37a)$$

$$P^{down}(k_x,\omega|z) \xrightarrow{IFT} P^{down}(x_r, z, \omega) \quad (37b)$$

Inverse transformation of the vertical-velocity wavefields are represented by:

$$V_z^{up}(k_x,\omega|z) \xrightarrow{IFT} V_z^{up}(x_r, z, \omega) \quad (38a)$$

$$V_z^{down}(k_x,\omega|z) \xrightarrow{IFT} V_z^{down}(x_r, z, \omega) \quad (38b)$$

For example, an inverse Fourier transform may be used to transform the up-going and down-going pressure and vertical-velocity wavefields associated with the extrapolation point $(k_x, \omega|z)$ 1404, shown in FIG. 14A, into up-going and down-going pressure wavefields and up-going and down-going vertical-velocity wavefields at a corresponding extrapolation point $(x_r, z, \omega)$ 1408 in the series of extrapolation points 1406 shown in FIG. 14B. In practice, the transformations represented by Equations 37-38 may be carried out using an inverse FFT ("IFFT") or an inverse DFT ("IDFT").

An imaging condition is used to calculate an image value $I(x_r, z)$ at each point in the series of points 1406 in the s-f domain. For example in FIG. 14C, an imaging condition is applied to each extrapolation point in the series of extrapolation points 1406, shown in FIG. 14B, to obtain an image value, denoted by $I(x_r, z)$, at each of the points 1410. The imaging condition can be a cross correlation of the extrapolated up-going and down-going pressure, or vertical velocity, wavefields in the s-f domain. In one implementation, the imaging condition that represents a free-surface image value for a selected receiver position x and extrapolation depth z is calculated by applying the following cross-correlation equation:

$$I(x_r, z) = \sum_\omega D(x_r, z, \omega)\overline{U(x_r, z, \omega)} \quad (39)$$

where the over-bar designates complex conjugation.
In one implementation, $D(x_r, z, \omega)$ represents $P^{down}(x_r, z, \omega)$ and $U(x_r, z, \omega)$ represents $P^{up}(x_r, z, \omega)$. In another implementation, $D(x_r, z, \omega)$ represents $V_z^{down}(x_r, z, \omega)$ and $U(x_r, z, \omega)$ represents $V_z^{up}(x_r, z, \omega)$. In still other implementations, the imaging condition may be a normalized cross-correlation given by:

$$I(x_r, z) = \frac{\sum_\omega U(x_r, z, \omega)\overline{D(x_r, z, \omega)}}{\sum_\omega U(x_r, z, \omega)\overline{U(x_r, z, \omega)}} \quad (40)$$

The maximum image value $I(x_r, z_0)$ of the set of image values $\{I(x_r, z)\}_z$ 1410 is determined. The z-coordinate value $z_0$ of the maximum image value $I(x_r, z_0)$ in the set $\{I(x_T, z)\}_z$ is taken as the elevation of the free surface above the receiver with x-coordinate $x_r$. In the example of FIG. 14C, the series of points 1410 represent image values the set of image values $\{I(x_r, z)\}_z$ that corresponds to the extrapolation points in the series of points 1406 in FIG. 14B. A shaded point $(x_r, z_0)$ 1412 represents the coordinates of the maximum image value $I(x_r, z_0)$ of set of the images values 1410. As a result, the shaded point $(x_r, z_0)$ 1412 is a point on the approximate frozen free-surface profile.

Figure 15:
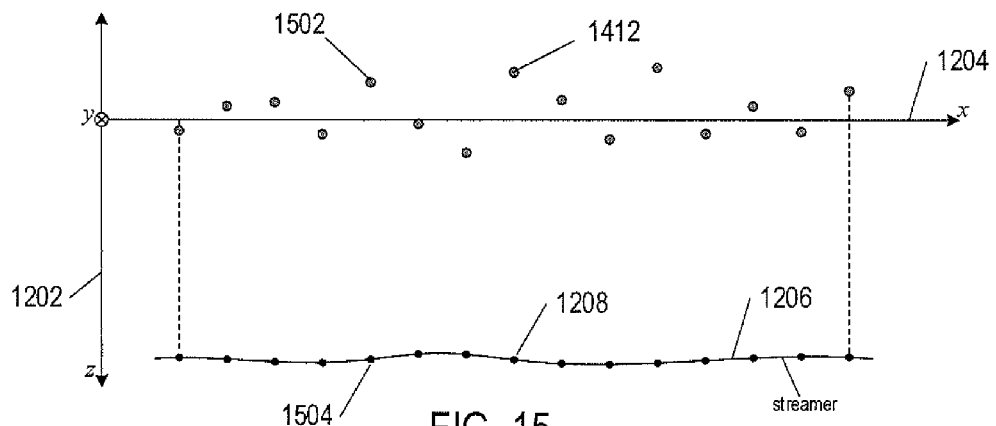
FIG. 15 shows maximum image values.

The process described above with reference to FIGS. 12-14 may be repeated using the pressure and particle-velocity data generated by each of the receivers of the streamer 1206. FIG. 15 shows maximum image values represented by shaded circles for each of the receivers of the streamer 1206. For example, maximum image value 1502 represents a point on the approximate frozen free-surface profile above a receiver 1504 obtained in the same manner as the maximum image value 1410 above the receiver 1208.

Once points of the approximate frozen free-surface profile above each receiver of the streamer have been computed, the approximate frozen free-surface profile above a streamer may be interpolated using spline interpolation, Lagrange interpolation, polynomial interpolation, or another suitable interpolation technique. In other implementations, the maximum image values associated with two or more streamers can be used to calculate an approximate three-dimensional free surface above the streamers using multi-dimensional interpolation techniques, such as Barnes interpolation, Bezier interpolation, bicubic interpolation, and bilinear interpolation. The approximate frozen free-surface profile is an approximation of the actual free-surface profile at the time the pressure data and vertical-velocity data were generated. Points along the approximate frozen free-surface profile are represented by $[x, f_{int}(x)]$ where x represents an in-line coordinate in the x-axis 1204 and $f_{int}(x)$ is the interpolated value of the approximate frozen free-surface profile.

Figure 16:
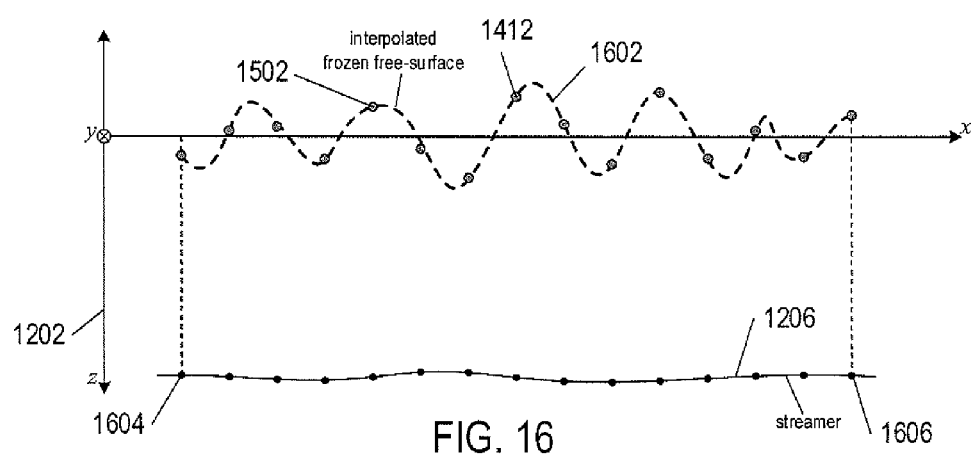
FIG. 16 shows a side-elevation view of an approximate frozen free-surface profile.

FIG. 16 shows a side-elevation view of the streamer 1206, and a dashed-line curve 1602 represents an approximate frozen free-surface profile. The approximate frozen free-surface profile is characterized by an interpolation function $f_{int}(x)$ that approximates the shape of the actual free surface between a first receiver 1604 and a last receiver 1606 at the time the pressure and particle-velocity data were generated by the receivers of the streamer 1206. Note that the cross-line receiver coordinate $y_r$ is suppressed, because the interpolation function $f_{int}(x)$ is determined in the in-line direction above the streamer 1206.

Figure 17:
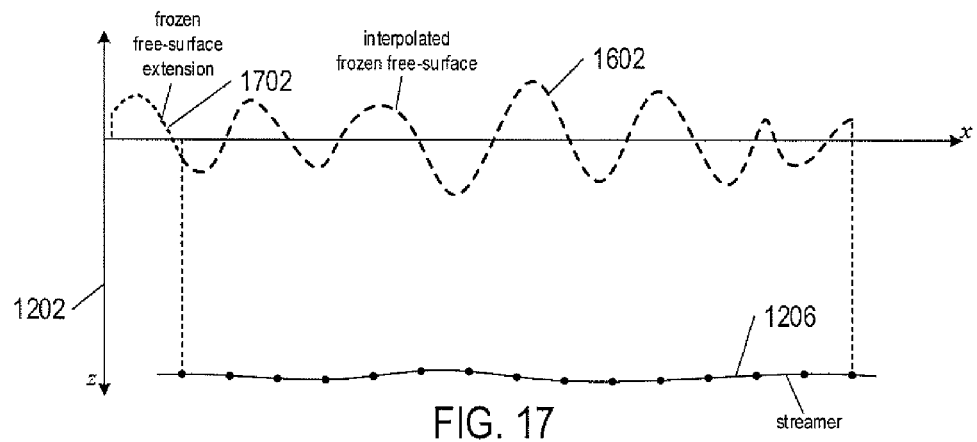
FIG. 17 shows a plot of an approximate frozen free-surface profile with a frozen free-surface extension.

An approximate frozen free-surface profile may be composed of the interpolation function $f_{int}(x)$ alone, or it may be composed of the interpolation function combined with frozen free-surface extensions that approximate the frozen free surface outside the first and last receiver coordinates. FIG. 17 shows a plot of a frozen free-surface extension combined with the interpolated frozen free surface shown in FIG. 16. Dotted curve 1702 represents a frozen free-surface extension. The frozen free-surface extension 1702 may be calculated from a free-surface model based on parameters associated with the weather conditions measured at the time of the marine survey. For example, a Pierson-Moskowitz model of the free surface may be used to calculate the frozen free-surface extension 1702. The Pierson-Moskowitz model of a free surface is based on the wind blowing steadily for a long period of time over a large free-surface area to produce waves that eventually reach a state of equilibrium. This condition is referred to as a "fully developed sea." The Pierson-Moskowitz model used to calculate an extension to the approximate frozen free-surface profile at a point x in the x-direction is given by:

$$f_{ext}(x) = \frac{1}{L}\sum_{q=0}^{Q-1} F(K_q)e^{iK_q x} \quad (41)$$

where for the integer index $q \geq 0$, $$F(K_q) = \sqrt{2\pi L W(K_q)} \begin{cases} [N(0,1) + jN(0,1)]/\sqrt{2} & \text{for } i \neq 0, Q/2 \\ N(0,1) & \text{for } i = 0, Q/2 \end{cases} \quad (42)$$

and for $q<0$, $F(K_q)=F(K_{-q})'$.

The parameter $W(K_q)$ is the Pierson-Moskowitz spatial roughness spectrum, which for a fully developed sea surface in one-dimension (e.g., x-direction) is given by:

$$W(K_q) = \left[\frac{\alpha}{4|K_q|^3}\right]\exp(-\beta g^2/K_q^2 U_w^4) \quad (43)$$

where
$K_q$ is the spatial wavenumber;
$U_w$ is the wind speed measured at a height of about 19 meters;
$\alpha$ is $8.0 \times 10^{-3}$;
$\beta$ is 0.74; and
g is the acceleration due to gravity.

In Equations (42) and (43), the spatial wavenumber for component q is given by $K_q=2\pi q/L$, where L is the length of free surface. The random number $N(0, 1)$ may be generated from a Gaussian distribution having zero mean and a unit variance. As a result, the free surface is formed by adding each wavenumber component imposing random phase shifts. A frozen-in-time Pierson-Moskowitz free surface may be computed from Equation (42) using a FFT for computational efficiency.

The frozen free-surface extension $f_{ext}(x)$ may be combined with the interpolation function $f_{int}(x)$ to form an approximate frozen free-surface profile given by:

$$f(x) = \begin{cases} f_{ext}(x) & \text{for } x \text{ outside first and last receivers} \\ f_{int}(x) & \text{for } x \text{ between first and last } receiers \end{cases} \quad (44)$$

In alternative implementations, the frozen free-surface extension may be expanded to include a time parameter that characterizes the frozen free surface at different times. Free-surface waves are generally dispersive and in deep water, and the frequency and wavenumber are related by a dispersion relation given by:

$$\Omega(K_q) = \sqrt{gK_q} \quad (45)$$

Equation (45) implies that each spatial harmonic component of the free-surface wavefield may move with a definite phase velocity. As a result, in general, free-surface waves of longer wavelengths travel faster relative to waves with shorter wavelengths. Combining Equations (41) and (45) gives a time-varying surface:

$$f_{ext}(x, t) = \frac{1}{L}\sum_{q=0}^{Q-1} F(K_q)e^{i(K_q x - \Omega(K_q)t)} \quad (46)$$

where t is instantaneous time.

Equation (46) characterizes a one-dimensional rough free surface moving in the positive x-direction and may be used to compute the frozen free-surface extension 1702 at earlier or later times.

Consider a free-surface shape at an instant in time t with wave heights given by Equation (46). The wavenumber spectrum $F(K_q)$ of the free surface may be computed according to Equation (41), and an arbitrary known dispersion relation $\Omega(K_q)$ calculated according to Equation (46) may be used to calculate the frozen free surface at an earlier $(t-\Delta t)$ or a later $(t+\Delta t)$ time by:

$$f_{ext}(x, t) = \frac{1}{L}\sum_{q=0}^{Q-1} F(K_q)e^{i(K_q x - \Omega(K_q)\Delta t)} \quad (47)$$

As described above with reference to Equations (6a) and (6b), a filter f that gives the difference D between the vertical-velocity data, $v_z(\vec{x}_r^k, t)$, subtracted from the filter f convolved with the noise-correct vertical-velocity data, $f*\tilde{v}_z(\vec{x}_r^k, t)$, is sought:

$$D = f*v_z(\vec{x}_r, t) - v_z(\vec{x}_r, t) \quad (48)$$

The filter f is composed of M+1 filter coefficients represented by a row matrix:

$$f = [f_0 \cdots f_M]^T \quad (49)$$

where
T represents transpose; and
$f_l$ is a filter coefficient with index $l=0, 1, \ldots, M$.
Components of $f*\tilde{v}_z(\vec{x}_r^k, t)$ are given by:

$$c(t_j) = \sum_{l=0}^{M} f_l \tilde{v}_z(\vec{x}_r, t_{j-l}) \quad (50)$$

where $j=0, 1, \ldots, J$ is the number of time samples.
In general, it is the case that $$v_z(\vec{x}_r, t_j) \approx c(t_j) \quad (51)$$

Now consider an energy error between the vertical-velocity data and the filter applied to the noise-correct vertical-velocity data given by:

$$Q(f) = \sum_{j=0}^{M+N} \left\{ v_z(\vec{x}_r, t_j) - \sum_{l=0}^{M} f_l \tilde{v}_z(\vec{x}_r, t_{j-l}) \right\}^2 \quad (52)$$

The filter coefficients minimize the energy error by setting:

$$\frac{\partial Q(f)}{\partial f_m} = 2 \sum_{j=0}^{M+N} \left\{ v_z(\vec{x}_r, t_j) - \sum_{l=0}^{M} f_l \tilde{v}_z(\vec{x}_r, t_{j-l}) \right\} \tilde{v}_z(\vec{x}_r, t_{j-m}) = 0 \quad (53)$$

for $m=0, 1, \ldots, M$. Rearranging Equation (53) gives:

$$\sum_{j=0}^{M+N} v_z(\vec{x}_r, t_j) \tilde{v}_z(\vec{x}_r, t_{j-m}) = \sum_{l=0}^{M} f_l \sum_{j=0}^{M+N} \{\tilde{v}_z(\vec{x}_r, t_{j-l}) \tilde{v}_z(\vec{x}_r, t_{j-m})\} \quad (54)$$

Equation (54) may be rewritten in matrix form to obtain:

$$u_{v\tilde{v}} = U_{\tilde{v}\tilde{v}} f_k \quad (55a)$$

where
$u_{v\tilde{v}}$ is an (M+1)×1 cross-correlation column matrix of measured and noise-correct vertical-velocity data with matrix elements $$u_m = \sum_{j=0}^{M+N} v_z(\vec{x}_r, t_j) \tilde{v}_z(\vec{x}_r, t_{j-m}) \quad (55b)$$

and $U_{\tilde{v}\tilde{v}}$ is an (M+1)×(M+1) auto-correlation matrix of the noise-correct vertical-velocity data with matrix elements $$U_{lm} = \sum_{j=0}^{M+N} \tilde{v}_z(\vec{x}_r, t_{j-l}) \tilde{v}_z(\vec{x}_r, t_{j-m}) \quad (55c)$$

The filter coefficients are computed by multiplying the matrix equation in Equation (55) by the inverse of the auto-correlation matrix $$f = U_{\tilde{v}\tilde{v}}^{-1} u_{v\tilde{v}} \quad (56)$$

where $U_{\tilde{v}\tilde{v}}^{-1}$ is the inverse of the auto-correlation matrix $U_{\tilde{v}\tilde{v}}$ provided the auto-correlation matrix is invertible.

Figure 18:
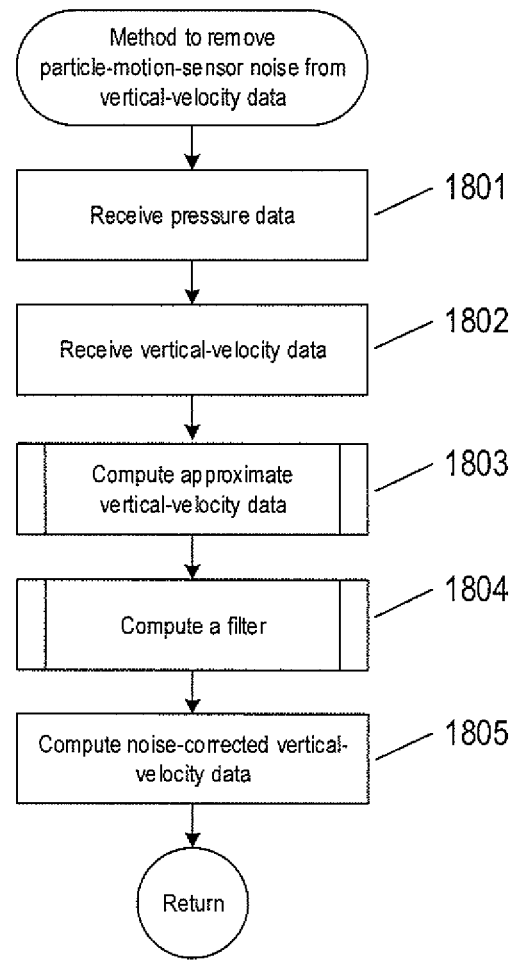
FIG. 18 shows a flow diagram of a method to remove particle-motion-sensor noise from vertical-velocity data.

FIG. 18 shows a flow diagram of a method to remove particle-motion-sensor noise from vertical-velocity data. In block 1801, pressure data generated by pressure sensors during a marine survey is received. In block 1802, vertical-velocity data generated by particle-motion sensors collocated with the pressure sensors during the marine survey is received. In block 1803, a routine "compute noise-correct vertical-velocity data" is called to compute noise-correct vertical-velocity data based on the pressure data and an approximate frozen free-surface profile that models the free-surface profile above the receivers when the pressure and vertical-velocity data was generated. In block 1804, a routine "compute a filter" is called to compute a filter based on the vertical-velocity data and the noise-correct vertical-velocity data at each receiver coordinate. In block 1805, noise-corrected vertical-velocity data composed of the signal component of the vertical-velocity data and noise-correct vertical-velocity data convolved with the filter is computed at each receiver coordinate. The vertical-velocity data may be computed by adding the difference between the vertical-velocity data and the noise-correct vertical-velocity data convolved with the filter as described above with reference Equations (6) and (8). The approximate particle-motion-sensor noise is based on the pressure-sensor noise and is convolved with the filter to replace the particle-motion-sensor noise in order to remove the low-frequency noise.

Figure 19:
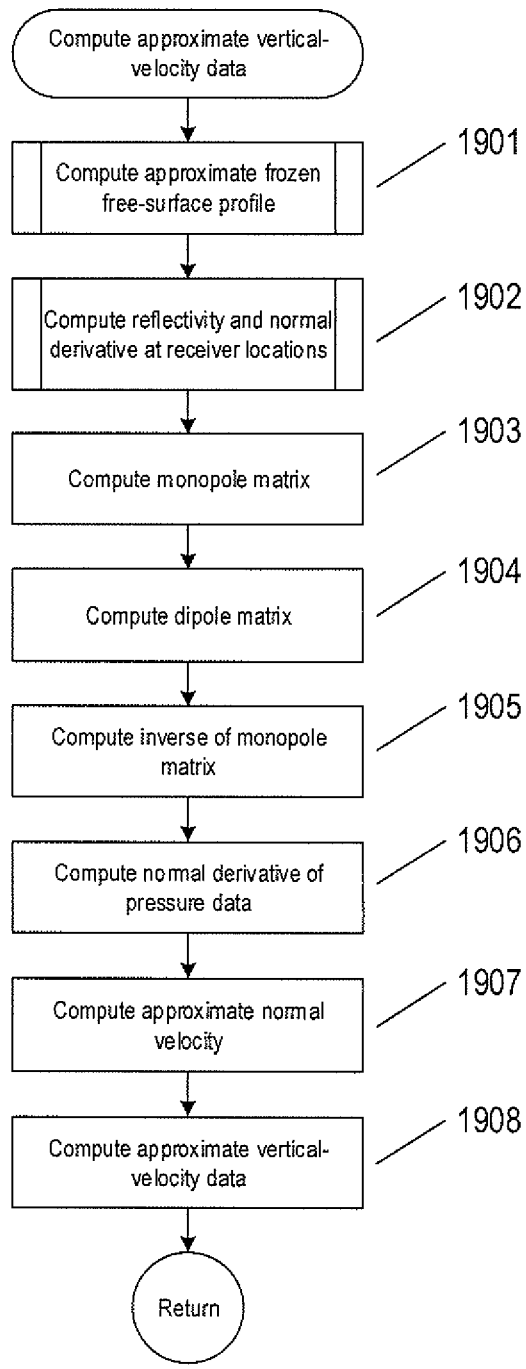
FIG. 19 shows a flow diagram that represents the routine "compute noise-correct vertical-velocity data" called in FIG. 18.

FIG. 19 shows a flow diagram that represents the routine "compute noise-correct vertical-velocity data" called in block 1803 of FIG. 18. In block 1901, a routine "compute approximate frozen free-surface profile" is called to compute a frozen free-surface profile that models, or approximates the shaped of, the actual profile of the free surface above the receivers when the pressure data and vertical-velocity data where generated. In block 1902, a routine "compute reflectivity and normal derivative at receiver locations" is called to compute the reflectivity at receiver locations based on the approximate frozen free-surface profile computed in block 1901. In block 1903, a monopole matrix is computed based on the reflectivity of the approximate frozen free-surface profile computed in block 1902, as described above with reference to Equation (21). In block 1904, a dipole matrix is computed based on the normal derivative of the reflectivity of the approximate frozen free-surface profile computed in block 1902, as described above with reference to Equation (21). In block 1905, an inverse of the monopole matrix is computed. In block 1906, a normal derivative of the pressure wavefield is computed as each receiver coordinate based on the inverse of the monopole matrix, the dipole matrix, and the measure pressure data, as described above with reference to Equation (24). In block 1907, approximate normal particle velocity data is computed at each receiver coordinate based on the normal derivative of the pressure wavefield, as described above with reference to Equation (25). In block 1908, noise-correct vertical-velocity data is computed at each receiver coordinate based the approximate normal particle velocity data and orientation of the receivers, as described above with reference to Equations (26)-(27).

Figure 20:
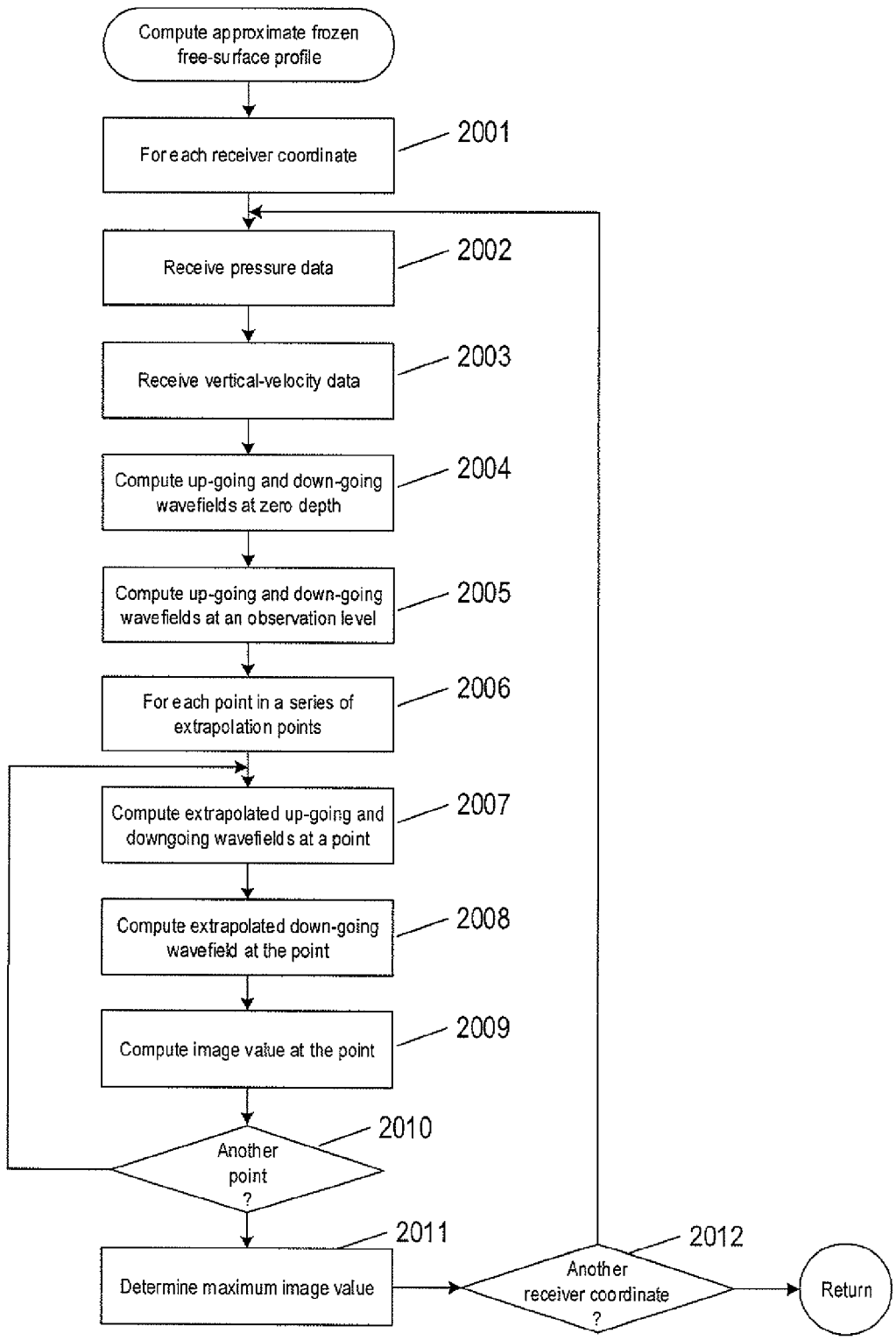
FIG. 20 shows a flow diagram that represents the routine "compute approximate frozen free-surface profile" called in FIG. 19.

FIG. 20 shows a flow diagram that represents the routine "compute approximate frozen free-surface profile" called in block 1901 of FIG. 19. A for-loop beginning with block 2001 repeats the operations of blocks 2002-2011 for each receiver coordinate of a seismic data acquisition system. For example, the receiver coordinates considered may be the receive coordinates of receivers located along a streamer of the seismic data acquisition system. In blocks 2002 and 2003, the pressure data and vertical-velocity data are received. In block 2004, up-going and down-going pressure wavefields at zero depth are computed as described above with reference to Equations (32a)-(32b). In block 2005, up-going and down-going wavefields are computed an observation level, as described above with reference to Equations (33a)-(33b). A for-loop beginning with block 2006 repeats the operations of blocks 2007-2010 for each point in a series of extrapolation point between the observation level and a point above the free surface. In blocks 2007 and 2008, extrapolated up-going and down-going wavefields are computed a point of the series of extrapolation points. In block 2009, an image value is computed at the point based on the extrapolated up-going and down-going wavefields, as described above with reference to Equation (39) and (40). In decision block 2010, when blocks 2007-2009 have been executed for all points of the series of extrapolation points, control flows to block 2011. In block 2011, the maximum image value is determined as described above with reference to FIG. 14. In decision block 2012, the operations represented by blocks 2002-2011 are repeated for another receiver coordinate.

FIG. 21 shows a flow diagram of the routine "compute reflectivity and normal derivative of approximate frozen free-surface profile" called in block 1902 of FIG. 19. In block 2101, unit normal vectors are computed for free-surface points as described above with reference to FIGS. 11A-11B. In block 2102, reflectivity is computed using the Green's function computed as described above with reference to Equation (30a) and based on the unit normal vectors at free-surface points. In block 2103, reflectivity at receiver locations are computed using the Green's function of Equation (30b). In block 2104, normal derivatives of the reflectivity at receiver locations, as described above with reference to Equation (30c).

FIG. 22 shows a flow diagram of the routine "compute a filter" called in block 1804 of FIG. 18. In block 2201, a cross-correlation matrix may be computed based on the measured and noise-correct vertical-velocity data, as described above with reference to Equation (54). In block 2202, an auto-correlation matrix may be computed based on the noise-correct vertical-velocity data, as described above with reference to Equation (55c). In block 2203, an inverse of the cross-correlation matrix is computed. In block 2204, the filter is computed as product of the inverse of the cross-correlation matrix and the auto-correlation matrix.

Figure 23:
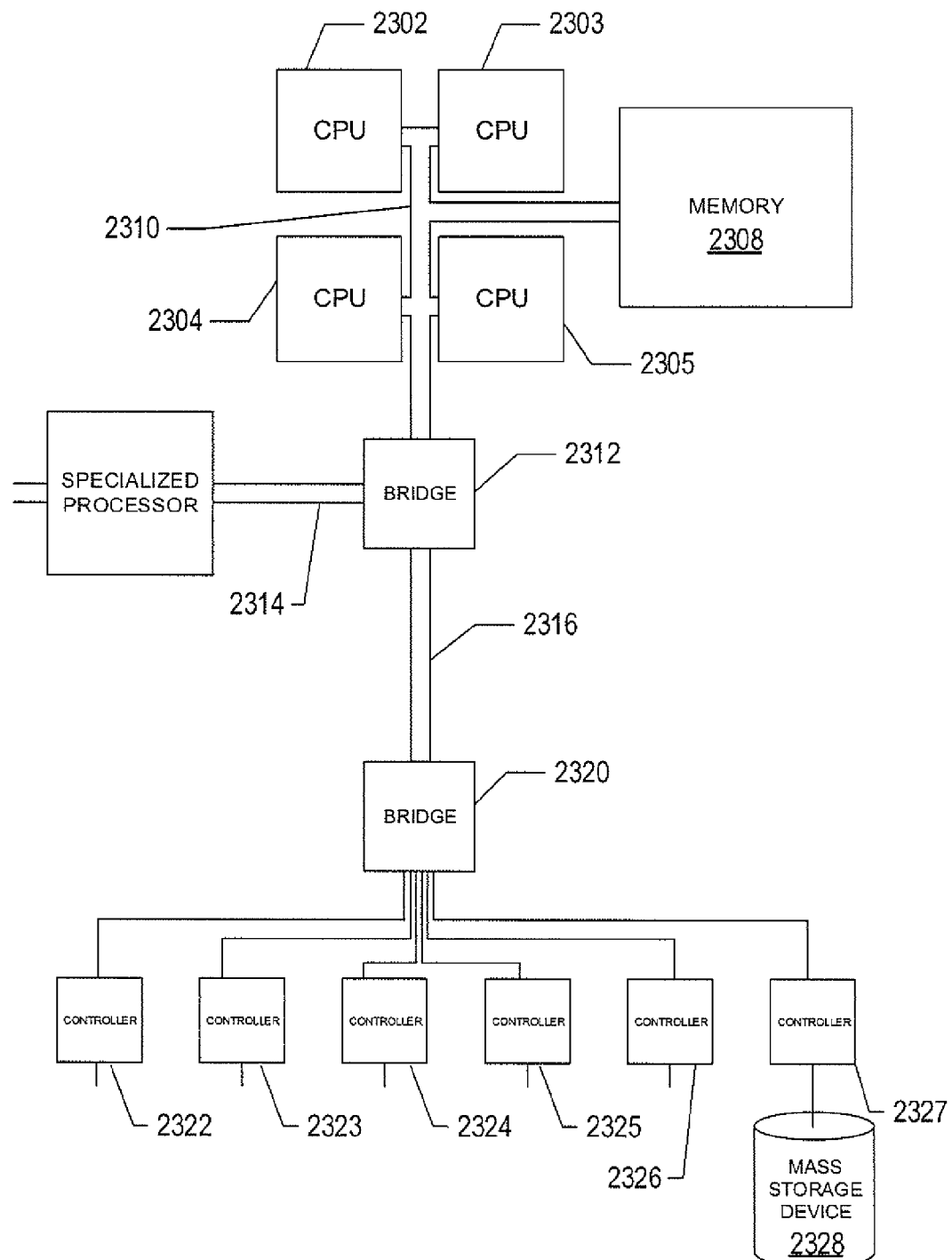
FIG. 23 shows an example of a generalized computer system that executes efficient methods to remove particle-motion-sensor noise from vertical-velocity data

FIG. 23 shows an example of a generalized computer system that executes efficient methods to remove low-frequency noise from vertical-velocity data and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 2302-2305, one or more electronic memories 2308 interconnected with the CPUs by a CPU/memory-subsystem bus 2310 or multiple busses, a first bridge 2312 that interconnects the CPU/memory-subsystem bus 2310 with additional busses 2314 and 2316, or other types of high-speed interconnection media, including multiple, high-speed serial interconnects. The busses or serial interconnections, in turn, connect the CPUs and memory with specialized processors, such as a graphics processor 2318, and with one or more additional bridges 2320, which are interconnected with high-speed serial links or with multiple controllers 2322-2327, such as controller 2327, that provide access to various different types of computer-readable media, such as computer-readable medium 2328, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2328 is a non-transitory data-storage device, including electronic memory, optical or magnetic disk drive, USB drive, flash memory and other such data-storage device. The computer-readable medium 2328 can be used to store machine-readable instructions and routines that encode the computational methods described above and can be used to store encoded data, during store operations, and from which encoded data can be retrieved, during read operations, by computer systems, data-storage devices, and peripheral devices.

The vertical-velocity data with pressure-sensor noise convolved with a filter computed as described above may form a geophysical data product indicative of certain properties of a subterranean formation. The geophysical data product may be stored on a computer-readable medium as described above. The geophysical data product may be produced offshore (i.e. by equipment on the survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for generating an image of a subterranean formation using marine seismic techniques in which one or more sources are activated above a subterranean formation, the reflections from the subterranean formation recorded as pressure data and vertical velocity data measured at each receiver coordinate of a seismic data acquisition system, the pressure data having a pressure-signal component and pressure-sensor noise and the vertical-velocity data having a vertical-velocity signal component and particle-motion-sensor noise, the specific improvement consisting of:

- computing approximate vertical-velocity data from the pressure data and the vertical-velocity data measured at each receiver coordinate of the seismic data acquisition system;
- computing a filter that gives a minimum difference between the vertical-velocity data and the approximate vertical-velocity data at each receiver coordinate;
- computing noise-corrected vertical-velocity data composed of the vertical-velocity signal component and an approximate particle-motion-sensor noise convolved with the filter at each receiver coordinate, the approximate particle-motion-sensor noise composed of the pressure-sensor noise;
- separating the pressure data into up-going pressure data and down-going pressure data based on the noise-corrected vertical-velocity data; and
- using the up-going pressure data in generating an image of the subterranean formation without receiver ghost effects and the particle-motion-sensor noise, thereby enhancing the image of the subterranean formation.

2. The process of claim 1 wherein computing the approximate vertical-velocity data further comprises:

- computing an approximate frozen free-surface profile that approximates the profile of the free surface above the receivers;
- computing reflectivity and normal derivative at the receiver coordinates based on the approximate frozen free-surface profile;
- computing a monopole matrix based on the reflectivity at the receiver coordinates;
- computing a dipole matrix based on the normal derivative at the receiver coordinates;
- computing an inverse of the monopole matrix;
- computing a normal derivative of the pressure wavefield at the receiver coordinates based the inverse of the monopole matrix, the dipole matrix and the pressure data recorded at each receiver coordinate;
- computing an approximate normal particle velocity at the receiver coordinates based on the normal derivatives of the pressure wavefield at the receiver coordinates; and
- computing the approximate vertical-velocity data at the receiver coordinates based on the approximate normal particle velocity at the receiver coordinates and orientation of the receivers.

3. The process of claim 2, wherein computing the approximate frozen free-surface profile further comprises:

- for each receiver coordinate,
  - computing up-going and down-going pressure wavefields at zero depth based on measured pressure and vertical-velocity data above a low-frequency range,
  - computing up-going and down-going pressure wavefields at an observation level between receiver depths and zero depth based on the up-going and down-going pressure wavefields at zero depth,
  - computing extrapolated up-going and down-going wavefields at a series of extrapolation points between the observation level to a distance above zero depth,
  - computing an image value at each extrapolation point based on the extrapolated up-going and down-going wavefields at each extrapolation point, and
  - determining a maximum image value; and
- computing an interpolation function based on the maximum image values at the receiver coordinates.

4. The process of claim 3, wherein computing the approximate frozen free-surface profile further comprises computing a frozen free-surface extension.

5. The process of claim 2, wherein in computing reflectivity and normal derivative at receiver coordinates further comprises:

- computing a unit normal vector of the approximate frozen free-surface profile;
- computing reflectivity of the approximate frozen free-surface profile based on the unit normal vector at points along the approximate frozen free-surface profile;
- computing reflectivity at the receiver coordinates based on the reflectivity of the approximate frozen free-surface profile; and
- computing normal derivative of the reflectivity at the receiver coordinates.

6. The process of claim 1, wherein computing the filter further comprises:

- computing a cross-correlation matrix based on the vertical-velocity data and the approximate vertical-velocity data;
- computing an auto-correlation matrix based on the vertical-velocity data;
- computing an inverse of the auto-correlation matrix; and
- computing the filter as the product of the inverse auto-correlation matrix and the cross-correlation matrix.

7. The process of claim 1, wherein the filter that gives the minimum difference further comprises computing the filter that gives the minimum difference between the vertical-velocity data subtracted from the approximate vertical-velocity data convolved with the filter.

8. The process of claim 1, wherein computing the noise-corrected vertical-velocity data further comprises adding the difference to the vertical-velocity data to generate the noise-corrected vertical-velocity data at each receiver coordinate.

9. The process of claim 1, wherein the noise-corrected vertical-velocity data further comprises the vertical-velocity data subtracted from the approximate vertical-velocity data convolved with the filter at each receiver coordinate.

10. The process of claim 1 executed on a programmable computer programmed to execute the method.

11. The process of claim 1, wherein the vertical-velocity data forms a geophysical data product, further comprising recording the geophysical data product on a physical, non-volatile computer-readable medium suitable for importing onshore.

12. The process of claim 11, further comprising performing geophysical analysis onshore on the geophysical data product.

13. A computer system that removes particle-motion-sensor noise from vertical-velocity data, the system comprising:

- one or more processors;
- one or more data-storage devices; and
- a routine stored in one or more of the data-storage devices that when executed by the one or more processors controls the system to carry out
  - computing approximate vertical-velocity data from pressure data and vertical-velocity data at each receiver coordinate of a seismic data acquisition system, the pressure data having a pressure-signal component and pressure-sensor noise and the vertical-velocity data having a vertical-velocity signal component and vertical-velocity-sensor noise;

computing a filter to give a minimum difference between the vertical-velocity data and the approximate vertical-velocity data at each receiver coordinate;

computing noise-corrected vertical-velocity data composed of the vertical-velocity signal component and an approximate particle-motion-sensor noise convolved with the filter at each receiver coordinate, the approximate particle-motion-sensor noise based on the pressure-sensor noise;

separating the pressure data into up-going pressure data and down-going pressure data based on the noise-corrected vertical-velocity data; and using the up-going pressure data in generating an image of the subterranean formation without receiver ghost effects and the particle-motion-sensor noise, thereby enhancing the image of the subterranean formation.

14. The computer system of claim 13 wherein computing the approximate vertical-velocity data further comprises:

computing an approximate frozen free-surface profile that approximates the profile of the free surface above the receivers;

computing reflectivity and normal derivative at the receiver coordinates based on the approximate frozen free-surface profile;

computing a monopole matrix based on the reflectivity the receiver coordinates;

computing a dipole matrix based on the normal derivative the receiver coordinates;

computing an inverse of the monopole matrix;

computing a normal derivative of the pressure wavefield at the receiver coordinates based the inverse of the monopole matrix, the dipole matrix and the pressure data recorded at each receiver coordinate;

computing an approximate normal particle velocity at the receiver coordinates based on the normal derivatives of the pressure wavefield at the receiver coordinates; and computing the approximate vertical-velocity data at the receiver coordinates based on the approximate normal particle velocity at the receiver coordinates and orientation of the receivers.

15. The computer system of claim 14, wherein computing the approximate frozen free-surface profile further comprises:

for each receiver coordinate,
  computing up-going and down-going pressure wavefields at zero depth based on measured pressure and vertical-velocity data above a low-frequency range,
  computing up-going and down-going pressure wavefields at an observation level between receiver depths and zero depth based on the up-going and down-going pressure wavefields at zero depth,
  computing extrapolated up-going and down-going wavefields at a series of extrapolation points between the observation level to a distance above zero depth,
  computing an image value at each extrapolation point based on the extrapolated up-going and down-going wavefields at each extrapolation point, and
  determining a maximum image value; and
computing an interpolation function based on the maximum image values at the receiver coordinates.

16. The computer system of claim 15, wherein computing the approximate frozen free-surface profile further comprises computing a frozen free-surface extension.

17. The computer system of claim 14, wherein in computing reflectivity and normal derivative at receiver coordinates further comprises:

computing a unit normal vector of the approximate frozen free-surface profile;

computing reflectivity of the approximate frozen free-surface profile based on the unit normal vector at points along the approximate frozen free-surface profile;

computing reflectivity at the receiver coordinates based on the reflectivity of the approximate frozen free-surface profile; and computing normal derivative of the reflectivity at the receiver coordinates.

18. The computer system of claim 13, wherein computing the filter further comprises:

computing a cross-correlation matrix based on the vertical-velocity data and the approximate vertical-velocity data;

computing an auto-correlation matrix based on the vertical-velocity data;

computing an inverse of the auto-correlation matrix; and computing the filter as the product of the inverse auto-correlation matrix and the cross-correlation matrix.

19. The computer system of claim 13, wherein the filter that gives the minimum difference further comprises computing the filter that gives the minimum difference between the vertical-velocity data subtracted from the approximate vertical-velocity data convolved with the filter.

20. The computer system of claim 13, wherein computing the noise-corrected vertical-velocity data further comprises adding the difference to the vertical-velocity data to generate the noise-corrected vertical-velocity data at each receiver coordinate.

21. The computer system of claim 13, wherein the noise-corrected vertical-velocity data further comprises the vertical-velocity data subtracted from the approximate vertical-velocity data convolved with the filter at each receiver coordinate.

22. A non-transitory computer-readable medium having machine-readable instructions encoded thereon that enables one or more processors of a computer system to perform the operations of computing approximate vertical-velocity data from pressure data and vertical-velocity data at each receiver coordinate of a seismic data acquisition system, the pressure data having a pressure-signal component and pressure-sensor noise and the vertical-velocity data having a vertical-velocity signal component and vertical-velocity-sensor noise;

computing a filter to give a minimum difference between the vertical-velocity data and the approximate vertical-velocity data at each receiver coordinate;

computing noise-corrected vertical-velocity data composed of the vertical-velocity signal component and an approximate particle-motion-sensor noise convolved with the filter at each receiver coordinate, the approximate particle-motion-sensor noise based on the pressure-sensor noise;

separating the pressure data into up-going pressure data and down-going pressure data based on the noise-corrected vertical-velocity data; and using the up-going pressure data in generating an image of the subterranean formation without receiver ghost effects and the particle-motion-sensor noise, thereby enhancing the image of the subterranean formation.

23. The non-transitory computer-readable medium of claim 22 wherein computing the approximate vertical-velocity data further comprises:

computing an approximate frozen free-surface profile that approximates the profile of the free surface above the receivers;

computing reflectivity and normal derivative the receiver coordinates based on the approximate frozen free-surface profile;

computing a monopole matrix based on the reflectivity the receiver coordinates;

computing a dipole matrix based on the normal derivative the receiver coordinates;

computing an inverse of the monopole matrix;

computing a normal derivative of the pressure wavefield at the receiver coordinates based the inverse of the monopole matrix, the dipole matrix and the pressure data recorded at each receiver coordinate;

computing an approximate normal particle velocity at the receiver coordinates based on the normal derivatives of the pressure wavefield at the receiver coordinates; and computing the approximate vertical-velocity data at the receiver coordinates based on the approximate normal particle velocity at the receiver coordinates and orientation of the receivers.

24. The non-transitory computer-readable medium of claim 23, wherein computing the approximate frozen free-surface profile further comprises:

for each receiver coordinate,
  computing up-going and down-going pressure wavefields at zero depth based on measured pressure and vertical-velocity data above a low-frequency range,
  computing up-going and down-going pressure wavefields at an observation level between receiver depths and zero depth based on the up-going and down-going pressure wavefields at zero depth,
  computing extrapolated up-going and down-going wavefields at a series of extrapolation points between the observation level to a distance above zero depth,
  computing an image value at each extrapolation point based on the extrapolated up-going and down-going wavefields at each extrapolation point, and
  determining a maximum image value; and computing an interpolation function based on the maximum image values at the receiver coordinates.

25. The non-transitory computer-readable medium of claim 24, wherein computing the approximate frozen free-surface profile further comprises computing a frozen free-surface extension.

26. The non-transitory computer-readable medium of claim 23, wherein in computing reflectivity and normal derivative at receiver coordinates further comprises:

computing a unit normal vector of the approximate frozen free-surface profile;

computing reflectivity of the approximate frozen free-surface profile based on the unit normal vector at points along the approximate frozen free-surface profile;

computing reflectivity at the receiver coordinates based on the reflectivity of the approximate frozen free-surface profile; and computing normal derivative of the reflectivity at the receiver coordinates.

27. The non-transitory computer-readable medium of claim 22, wherein computing the filter further comprises:

computing a cross-correlation matrix based on the vertical-velocity data and the approximate vertical-velocity data;

computing an auto-correlation matrix based on the vertical-velocity data;

computing an inverse of the auto-correlation matrix; and computing the filter as the product of the inverse auto-correlation matrix and the cross-correlation matrix.

28. The non-transitory computer-readable medium of claim 22, wherein the filter that gives the minimum difference further comprises computing the filter that gives the minimum difference between the vertical-velocity data subtracted from the approximate vertical-velocity data convolved with the filter.

29. The non-transitory computer-readable medium of claim 22, wherein the noise-corrected vertical-velocity data further comprises adding the difference to the vertical-velocity data to generate the noise-corrected vertical-velocity data at each receiver coordinate.

30. The non-transitory computer-readable medium of claim 22, wherein the noise-corrected vertical-velocity data further comprises the vertical-velocity data subtracted from the approximate vertical-velocity data convolved with the filter at each receiver coordinate.

* * * * *